(12) United States Patent
Dellal et al.

(10) Patent No.: US 12,428,846 B2
(45) Date of Patent: Sep. 30, 2025

(54) FLUID DEPOSITION SYSTEM AND METHOD

(71) Applicant: Floe, Inc., New York, NY (US)

(72) Inventors: David Dellal, New York, NY (US); Hector Castillo, Boerne, TX (US); Mitchell Guillaume, Farmington, ME (US)

(73) Assignee: FLOE, LLC, New York, NY (US)

( * ) Notice: Subject to any disclaimer, the term of this patent is extended or adjusted under 35 U.S.C. 154(b) by 0 days.

(21) Appl. No.: 17/622,289

(22) PCT Filed: Sep. 8, 2020

(86) PCT No.: PCT/US2020/049655
§ 371 (c)(1),
(2) Date: Dec. 23, 2021

(87) PCT Pub. No.: WO2021/046511
PCT Pub. Date: Mar. 11, 2021

(65) Prior Publication Data
US 2022/0268028 A1    Aug. 25, 2022

Related U.S. Application Data

(60) Provisional application No. 62/897,345, filed on Sep. 8, 2019.

(51) Int. Cl.
*E04D 13/10*      (2006.01)
*A01G 25/16*     (2006.01)
*E04D 13/076*   (2006.01)

(52) U.S. Cl.
CPC ......... *E04D 13/103* (2013.01); *A01G 25/167* (2013.01); *E04D 13/0762* (2013.01)

(58) Field of Classification Search
CPC . E04D 13/103; E04D 13/0762; A01G 25/167; A01G 25/16
See application file for complete search history.

(56) References Cited

U.S. PATENT DOCUMENTS 10,112,582 B2 * 10/2018 Dudar ................... B60S 1/0833
10,730,486 B1 *  8/2020 Krause ................ G05D 7/0641
(Continued)

FOREIGN PATENT DOCUMENTS

CN    107964912 A  *  4/2018
CN    108732951 A     11/2018
(Continued)

OTHER PUBLICATIONS

Written Opinion & International Search Report for PCT/US2020/049655 dated Dec. 3, 2020, (7 pages).
(Continued)

*Primary Examiner* — Chad G Erdman
(74) *Attorney, Agent, or Firm* — Reising Ethington P.C.

(57) ABSTRACT

A fluid deposition system is provided. The system comprises one or more electronic processors, and one or more electronic memories each electrically connected to at least one of the one or more processors and having instructions stored therein. The processor(s) is/are configured to access the memory or memories and execute the instructions stored therein such that the processor(s) is/are configured to: determine whether one or more predetermined criteria are met for initiating deposition of fluid onto an area of interest; when it is determined that the criteria is/are met, determine one or more operating parameters of the fluid deposition system to use in the deposition of the fluid onto the area of interest; and following the determination of the operating parameter(s),
(Continued)

generate one or more electrical signals to cause the fluid to be deposited onto the area of interest in accordance with the determined parameter(s).

20 Claims, 7 Drawing Sheets

(56) References Cited

U.S. PATENT DOCUMENTS

| | | | |
|---|---|---|---|
| 2004/0195357 A1* | 10/2004 | Doherty | B60T 8/172 239/172 |
| 2005/0082435 A1* | 4/2005 | Rasmussen | B64F 5/20 244/134 C |
| 2006/0113401 A1 | 6/2006 | Leonhardt et al. | |
| 2013/0112765 A1* | 5/2013 | Mercnik | E01H 10/005 239/548 |
| 2014/0217194 A1 | 8/2014 | Han et al. | |
| 2015/0298826 A1* | 10/2015 | Luca | B05B 13/005 244/134 R |
| 2017/0253201 A1 | 9/2017 | Maeshiro | |

FOREIGN PATENT DOCUMENTS

| | | |
|---|---|---|
| EP | 2299001 A1 | 3/2011 |
| KR | 101785243 B1 * | 10/2017 |

OTHER PUBLICATIONS

Extended European Search Report corresponding to European application 20860710.1, dated May 4, 2023, 7 pages.

* cited by examiner

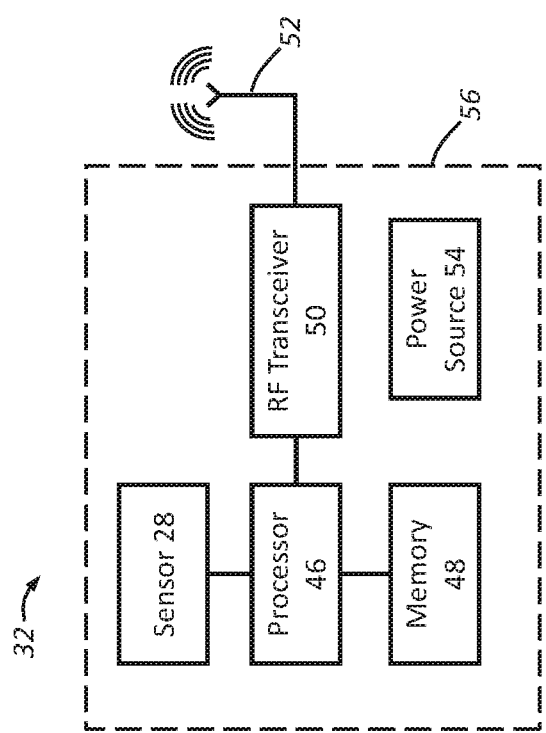

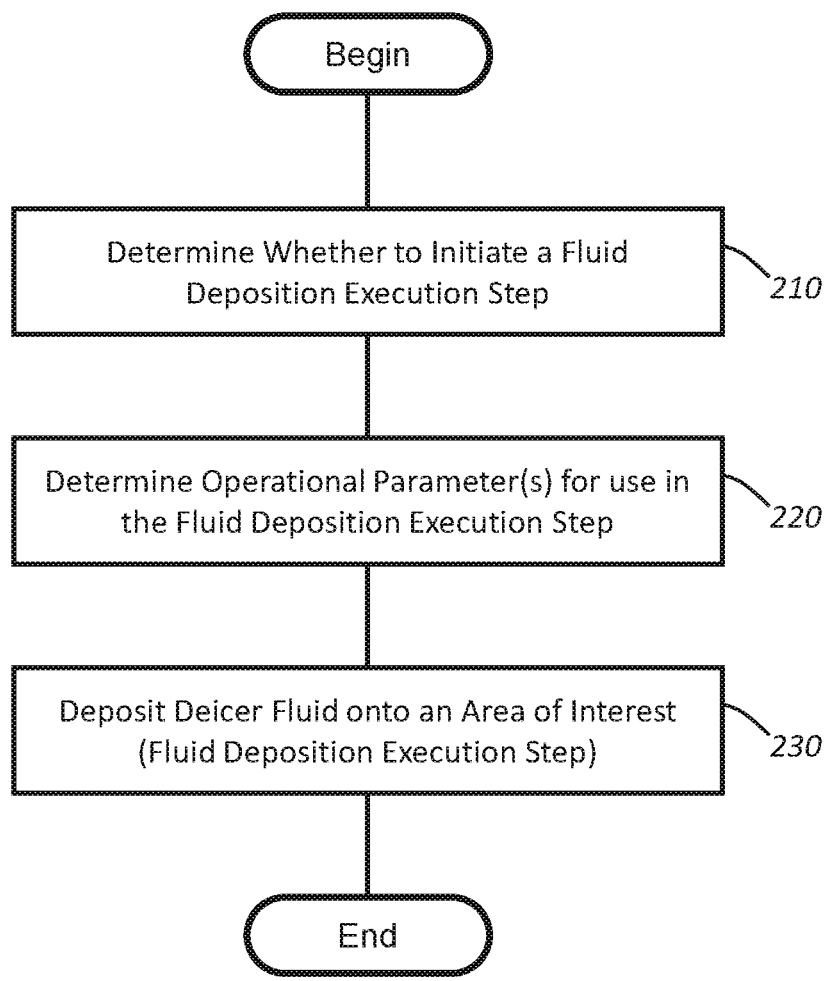

FLUID DEPOSITION SYSTEM AND METHOD

CROSS REFERENCE TO RELATED APPLICATIONS

This application claims the benefit of U.S. Provisional Application Ser. No. 62/897,345 filed on Sep. 8, 2019, which is hereby incorporated by reference in its entirety.

TECHNICAL FIELD

This invention relates to fluid deposition, and more particularly, to methods and systems for depositing fluid onto an area or surface of interest.

BACKGROUND

Systems for depositing fluid for various purposes are well-known. Examples of these systems may include, without limitation, sprinkler systems for watering and/or fertilizing grass, plants, and other vegetation and fire suppression systems installed in buildings. Another example is a system for preventing the build-up of snow and/or ice on surfaces of interest, for example, roofs of buildings. These systems, which may be referred to as deicer or deicing systems, may be used to, among other things, prevent or mitigate the formation of ice dams on the roof of a building.

An ice dam is a ridge of ice that may form at various locations on a roof of a building, for example, at the edge of a roof, and prevents melting snow from draining off the roof. The water that backs up behind the ice dam may leak into the building potentially resulting in damage to walls, ceilings, insulation, and other areas. Some conventional deicing systems may include certain mechanisms that prevent ice dam formation and/or that melt the ice so as to mitigate potential damages caused by ice dams. Such mechanisms may include heating elements that are placed around the area of interest and deicer fluid that is disposed on the area or surface of interest. Systems employing heating elements for preventing ice dams are prone to elevated risks, such as house fires.

U.S. Patent Application Publication No. 2019/0112815 teaches a deicer system that distribute a deicing fluid along a roof to limit or mitigate the build-up of snow and the formation of ice dams. In general terms, such a system may include a deicer fluid source and a dispenser having one or more emitters located proximate to a surface or area at which an ice dam may form. The emitters are fluidly coupled to the deicer fluid source such that when the system is activated, deicer fluid may flow to the emitters where it is deposited onto the surface of interest.

While conventional deicing system have proved effective in preventing or at least reducing or mitigating the build-up of snow and ice on surfaces of interest, they are not without their drawbacks. For example, conventional systems do not allow for the monitoring and evaluation of the performance of the system in order to optimize system performance. Additionally, while some conventional systems may allow for automated to activation based on sensed real-time environmental conditions (e.g., temperature, moisture) that may cause snow or ice build-up and/or ice dam formation, such systems do not allow for automatic activation based on predicted future conditions (e.g., based on weather forecasts). That is, activation of conventional systems is more responsive or reactive as opposed to predictive.

SUMMARY

According to one aspect of the invention, there is provided a fluid deposition system. The fluid deposition system comprises one or more electronic processors and one or more electronic memories each electrically connected to at least one of the one or more electronic processors and having instructions stored therein. The one or more electronic processors is configured to access the one or more electronic memories and execute the instructions stored therein such that the one or more electronic processors is configured to: determine whether one or more predetermined criteria are met for initiating deposition of fluid onto an area of interest; when it is determined that the one or more predetermined criteria are met, determine one or more operating parameters of the fluid deposition system to use in the deposition of the fluid onto the area of interest; and following the determination of the one or more operating parameters, generate one or more electrical signals to cause the fluid to be deposited onto the area of interest in accordance with the determined one or more operating parameters.

According to various embodiments, the fluid deposition system may further include any one of the following features or any technically-feasible combination of some or all of the features:

the fluid deposition system comprises a deicer system configured to deposit deicer fluid onto the area of interest;

the fluid deposition system comprises a system for depositing cleaning fluid onto an area of interest;

the one or more electronic processors is configured to obtain information relating to one or more predicted environmental conditions, and to determine whether at least one of the one or more predetermined criteria are met based on the obtained information;

the one or more electronic processors is configured to determine whether a predetermined amount of time has elapsed since fluid was last deposited onto the area of interest, and/or to determine whether the one or more predetermined criteria are met based on that determination;

the one or more electronic processors is configured to obtain information relating to the area of interest, and to determine whether at least one of the one or more predetermined criteria are met based on the obtained information;

the one or more electronic processors is configured to determine that a command has been received from one or more other components of the system, and that at least one of the one or more predetermined criteria are met based on the received command;

the one or more electronic processors is configured to determine at least one of the one or more operating parameters by obtaining information relating to one or more other operating parameters of the system, and to determine the at least one of the one or more operating parameters based on the obtained information;

the one or more electronic processors is configured to obtain information relating to the performance of the system, and to determine at least one of the one or more operating parameters based on the obtained information;

the one or more electronic processors is configured to obtain information relating to one or more environmental conditions, and to determine at least one of the one or more operating parameters based on the obtained information;

the one or more electronic processors is configured to obtain information from a remote source and to determine at least one of the one or more operating parameters based on the obtained information; and the one or more electrical signals generated by the one or more electronic processors comprise one or more activation signals that activate one or more components of the system to cause the fluid to be deposited onto the area of interest in accordance with the determined one or more operating parameters.

According to another aspect of the invention, a method of operating a fluid deposition system is provided. The method comprises: determining, by one or more electronic processors, whether one or more predetermined criteria are met for initiating deposition of fluid onto an area of interest; when it is determined that the one or more predetermined criteria are met, determining, by the one or more electronic processors, one or more operating parameters of the fluid deposition system to use in the deposition of the fluid onto the area of interest; and following the determination of the one or more operating parameters, generating, by the one or more electronic processors, one or more electrical signals to cause the fluid to be deposited onto the area of interest in accordance with the determined one or more operating parameters.

According to various embodiments, the method may further include any one of the following features or any technically-feasible combination of some or all of the features:
 the fluid deposition system comprises a deicer system configured to deposit deicer fluid onto the area of interest;
 the fluid deposition system comprises a system for depositing cleaning fluid onto the area of interest;
 determining whether the one or more predetermined criteria are met comprises obtaining information relating to one or more predicted environmental conditions and determining whether at least one of the one or more predetermined criteria are met based on the obtained information;
 determining whether the one or more predetermined criteria are met comprises determining whether a predetermined period of time has elapsed since fluid was last deposited onto the area of interest, and determining whether at least one of the one or more predetermined criteria are met based on that determination;
 determining whether the one or more predetermined criteria are met comprises obtaining information relating to the area of interest, and determining whether at least one of the one or more predetermined criteria are met based on the obtained information;
 determining that a command has been received and then determining that at least one of the one or more predetermined criteria are met based on the received command;
 determining one or more operating parameters comprises obtaining information relating to one or more other operating parameters of the system, and determining at least one of the one or more operating parameters based on the obtained information;
 determining one or more operating parameters comprises obtaining information relating to the performance of the system, and determining at least one of the one or more operating parameters based on the obtained information;
 determining one or more operating parameters comprises obtaining information relating to one or more environmental conditions, and determining at least one of the one or more operating parameters based on the obtained information;
 generating one or more electrical signals comprises generating one or more activation signals that activate one or more components of the system to cause the fluid to be deposited onto the area of interest in accordance with the determined one or more operating parameters;
 obtaining information from a remote source and determining at least one of the one or more operating parameters based on the obtained information; and
 receiving one or more electrical signals representative of information relating to one or more conditions at the area of interest, and wherein at least one of the steps of determining whether one or more predetermined criteria are met and determining one or more operating parameters of the fluid deposition system are based on the received information.

According to another aspect of the invention, a non-transitory, computer-readable storage medium is provided for storing program instructions thereon that, when executed on one or more electronic processors of a fluid deposition system, causes the one or more electronic processors to carry out the method of: determining whether one or more predetermined criteria are met for initiating deposition of fluid onto an area of interest; when it is determined that the one or more predetermined criteria are met, determining one or more operating parameters of the fluid deposition system to use in the deposition of the fluid onto the area of interest; and following the determination of the one or more operating parameters, generating one or more electrical signals to cause the fluid to be deposited onto the area of interest in accordance with the determined one or more operating parameters.

According to various embodiments, the method may further include any one of the following features or any technically-feasible combination of some or all of the features:
 the fluid deposition system comprises a deicer system configured to deposit deicer fluid onto the area of interest;
 the fluid deposition system comprises a system for depositing cleaning fluid onto the area of interest;
 determining whether the one or more predetermined criteria are met comprises obtaining information relating to one or more predicted environmental conditions and determining whether at least one of the one or more predetermined criteria are met based on the obtained information;
 determining whether the one or more predetermined criteria are met comprises determining whether a predetermined period of time has elapsed since fluid was last deposited onto the area of interest, and determining whether at least one of the one or more predetermined criteria are met based on that determination;
 determining whether the one or more predetermined criteria are met comprises obtaining information relating to the area of interest, and determining whether at least one of the one or more predetermined criteria are met based on the obtained information;
 determining that a command has been received and then determining that at least one of the one or more predetermined criteria are met based on the received command;
 determining one or more operating parameters comprises obtaining information relating to one or more other operating parameters of the system, and determining at least one of the one or more operating parameters based on the obtained information;

determining one or more operating parameters comprises obtaining information relating to the performance of the system, and determining at least one of the one or more operating parameters based on the obtained information;

determining one or more operating parameters comprises obtaining information relating to one or more environmental conditions, and determining at least one of the one or more operating parameters based on the obtained information;

obtaining information from a remote source and determining at least one of the one or more operating parameters based on the obtained information; and generating one or more electrical signals comprises generating one or more activation signals that activate one or more components of the system to cause the fluid to be deposited onto the area of interest in accordance with the determined one or more operating parameters; and receiving one or more electrical signals representative of information relating to one or more conditions at the area of interest, and wherein at least one of the steps of determining whether one or more predetermined criteria are met and determining one or more operating parameters of the fluid deposition system are based on the received information.

According to another aspect of the invention, a fluid deposition system is provided. The fluid deposition system comprises one or more electronic processors, and one or more electronic memories each configured to be electrically connected to at least one of the one or more electronic processors and having instructions stored therein. The one or more electronic processors is configured to access the one or more electronic memories and execute the instructions stored therein such that the one or more electronic processors is configured to: determine whether one or more predetermined criteria are met for initiating deposition of fluid onto an area of interest; and when it is determined that the one or more predetermined criteria are met, generate one or more electrical signals to cause the fluid to be deposited onto the area of interest in accordance with the determined one or more operating parameters.

According to various embodiments, the fluid deposition system may further include any one of the following features or any technically-feasible combination of some or all of the features:

the fluid deposition system comprises a deicer system configured to deposit deicer fluid onto the area of interest;

the fluid deposition system comprises a system for depositing cleaning fluid onto an area of interest;

the one or more electronic processors is configured to obtain information relating to one or more predicted environmental conditions, and to determine whether at least one of the one or more predetermined criteria are met based on the obtained information;

the one or more electronic processors is configured to determine whether a predetermined amount of time has elapsed since fluid was last deposited onto the area of interest, and to determine whether the one or more predetermined criteria are met based on that determination;

the one or more electronic processors is configured to obtain information relating to the area of interest, and to determine whether at least one of the one or more predetermined criteria are met based on the obtained information; and the one or more electrical signals generated by the one or more electronic processors comprise one or more activation signals that activate one or more components of the system to cause the fluid to be deposited onto the area of interest in accordance with the determined one or more operating parameters.

According to another aspect to of the invention, a method of operating a fluid deposition system is provided. The method comprises: determining, by one or more electronic processors, whether one or more predetermined criteria are met for initiating deposition of fluid onto an area of interest; and when it is determined that the one or more predetermined criteria are met, generating, by the one or more electronic processors, one or more electrical signals to cause the fluid to be deposited onto the area of interest in accordance with the determined one or more operating parameters.

According to various embodiments, the method may further include any one of the following features or any technically-feasible combination of some or all of the features:

the fluid deposition system comprises a deicer system configured to deposit deicer fluid onto the area of interest;

the fluid deposition system comprises a system for depositing cleaning fluid onto the area of interest;

determining whether the one or more predetermined criteria are met comprises obtaining information relating to one or more predicted environmental conditions and determining whether at least one of the one or more predetermined criteria are met based on the obtained information;

determining whether the one or more predetermined criteria are met comprises determining whether a predetermined period of time has elapsed since fluid was last deposited onto the area of interest, and determining whether at least one of the one or more predetermined criteria are met based on that determination;

determining whether the one or more predetermined criteria are met comprises obtaining information relating to the area of interest, and determining whether at least one of the one or more predetermined criteria are met based on the obtained information;

generating one or more electrical signals comprises generating one or more activation signals that activate one or more components of the system to cause the fluid to be deposited onto the area of interest in accordance with the determined one or more operating parameters; and receiving one or more electrical signals representative of information relating to one or more conditions at the area of interest, and wherein determining whether one or more predetermined criteria are met is based on the received information.

According to another aspect of the invention, a non-transitory, computer-readable storage medium is provided for storing program instructions thereon that, when executed on one or more electronic processors of a fluid deposition system, causes the one or more electronic processors to carry out the method of: determining whether one or more predetermined criteria are met for initiating deposition of fluid onto an area of interest; and when it is determined that the one or more predetermined criteria are met, generating one or more electrical signals to cause the fluid to be deposited onto the area of interest in accordance with the determined one or more operating parameters.

According to various embodiments, the method may further include any one of the following features or any technically-feasible combination of some or all of the features:
- the fluid deposition system comprises a deicer system configured to deposit deicer fluid onto the area of interest;
- the fluid deposition system comprises a system for depositing cleaning fluid onto the area of interest;
- determining whether the one or more predetermined criteria are met comprises obtaining information relating to one or more predicted environmental conditions and determining whether at least one of the one or more predetermined criteria are met based on the obtained information;
- determining whether the one or more predetermined criteria are met comprises determining whether a predetermined period of time has elapsed since fluid was last deposited onto the area of interest, and determining whether at least one of the one or more predetermined criteria are met based on that determination;
- determining whether the one or more predetermined criteria are met comprises obtaining information relating to the area of interest, and determining whether at least one of the one or more predetermined criteria are met based on the obtained information;
- generating one or more electrical signals comprises generating one or more activation signals that activate one or more components of the system to cause the fluid to be deposited onto the area of interest in accordance with the determined one or more operating parameters; and
- receiving one or more electrical signals representative of information relating to one or more conditions at the area of interest, and wherein determining whether one or more predetermined criteria are met is based on the received information.

According to another aspect of the invention, a system for detecting leaks in an area of interest is provided. The system comprises one or more electronic processors, and one or more electronic memories each electrically connected to at least one of the one or more electronic processors and having instructions stored therein. The one or more electronic processors is configured to access the one or more electronic memories and execute the instructions stored therein such that the one or more electronic processors is configured to: determine how much fluid is emitted when performing a test for detecting leaks in the area of interest; determine a volume of fluid that is received after passing over the area of interest; determine a difference between the emitted and received volumes of fluid; and, based on the determined difference, determine whether there is a leak in the area or surface of interest.

According to another aspect of the invention, a method for detecting leaks in an area of interest is provided. The method comprises: determining how much fluid is emitted when performing a test for detecting leaks in the area of interest; determining a volume of fluid that is received after passing over the area of interest; determining the difference between the emitted and received volumes of fluid; and, based on the determined difference, determining whether there is a leak in the area or surface of interest.

According to another aspect of the invention, a non-transitory, computer-readable storage medium is provided for storing program instructions thereon that, when executed on one or more electronic processors of a leak detection system, causes the one or more electronic processors to carry out the method of: determining how much fluid is emitted when performing a test for detecting leaks in the area of interest; determining a volume of fluid that is received after passing over the area of interest; determining the difference between the emitted and received volumes of fluid; and, based on the determined difference, determining whether there is a leak in the area or surface of interest.

According to another aspect of the invention, a fluid deposition system is provided. The fluid deposition system comprises: a fluid source; a dispenser having one or more emitters; and electronic controller that is configured to cause fluid from the fluid source to be provided to the dispenser where it may be deposited onto an area of interest.

According to various embodiments, the fluid deposition system may further include any one of the following features or any technically-feasible combination of some or all of the features: one or more sensors; a remote server system having one or more servers configured for communication with the electronic controller; a remote data server configured for communication with the electronic controller and having a data server application; and a client device configured for communication with the electronic controller.

Further aspects or areas of applicability of the present disclosure will become apparent from the detailed description, claims and drawings provided hereinafter. It should be understood that the summary and detailed description, including the disclosed embodiments and drawings, are merely illustrative in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

One or more aspects of the disclosure will hereinafter be described in conjunction with the appended drawings, wherein like designations denote like elements, and wherein:

FIG. 8 is a block diagram of an illustrative embodiment of a communications system in which the system shown in FIG. 1 may be used; and FIG. 9 is a flowchart of an illustrative embodiment of a method that may be used to deposit fluid onto an area of interest.

DETAILED DESCRIPTION

The system and method described herein can be used to emit, dispense, or deposit (collectively, referred to herein as "deposit") a fluid onto a surface of interest for one or more purposes. More specifically, the system and method may be used to deposit fluid on a surface of interest to, for example, prevent the build-up of snow and/or ice on the surface of interest. For the sake of clarity and illustration, the description below will be primarily with respect to such a deicing or deicer system that is configured to deposit a deicer fluid onto a surface of interest for the purpose of preventing, mitigating, or otherwise reducing the build-up of snow and/or ice on the surface of interest.

As was eluded to above, however, it will be appreciated that the system and method described herein may certainly lend themselves to other applications in which fluid is deposited for different reasons or purposes, including, but not limited to, depositing a cleaning solution onto a surface of interest to be disinfected or cleaned, depositing water onto grass, plants, or other vegetation, and depositing a nutrient plant solution onto grass, plants or other vegetation, and/or soil in which the plants are being or are to be grown, to name but a few applications. Accordingly, it will be appreciated that the present disclosure is not intended to be limited to any particular application for the system and method described herein.

Figure 1:
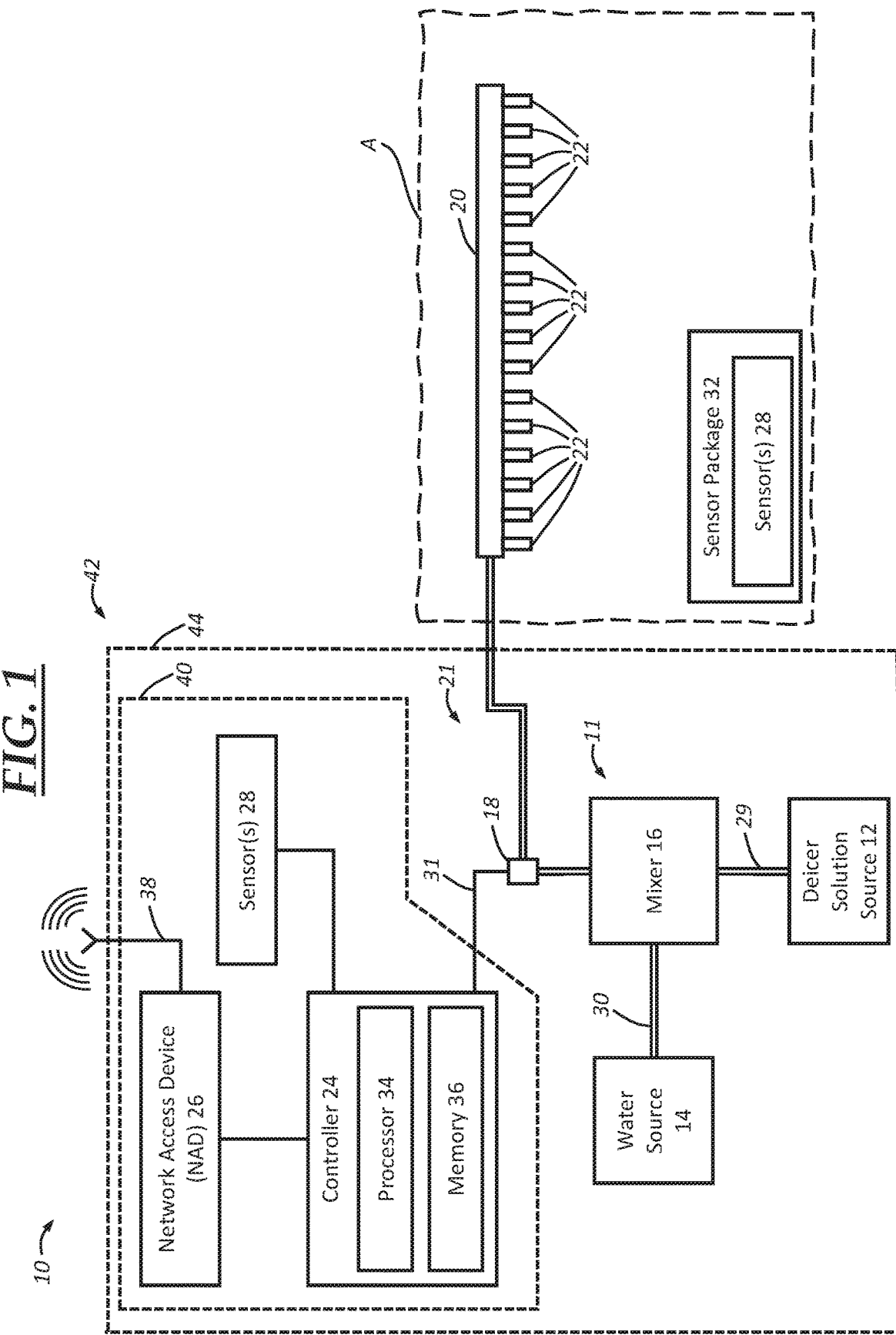
FIG. 1 is a block diagram of an illustrative embodiment of a fluid deposition system in the nature of a deicer system.

FIG. 1 depicts a fluid deposition system 10 according to one embodiment in which the system 10 is a deicer or deicing system (i.e., deicing or deicer system 10). In accordance with an illustrative embodiment, the deicer system 10 may generally include: a deicer fluid source 11, which, in an embodiment, may comprise one or more of a deicer solution source 12, a water source 14, and a mixer 16; an electronically-controlled valve 18; a dispenser 20 having one or more emitters 22; an electronic controller 24; a network access device (NAD) 26, and one or more sensors 28. It will be appreciated, however, that in other embodiments, the system 10 may include more or less than those components identified above.

The deicer solution source 12 may comprise a container or reservoir configured to hold or store a deicer solution therein. In the illustrative embodiment shown in FIG. 1, the deicer solution source 12 is in fluid communication with the mixer 16 via a fluid path 29 therebetween. The deicer solution stored in the deicer solution source 12 is intended to be supplied to the mixer 16 which mixes the deicer solution with water provided by the water source 14 to form a deicer fluid. In some embodiments, the deicer solution includes one or more inorganic chemical deicer crystals, one or more organic chemical deicer crystals, and/or one or more alcohol-based materials. U.S. Patent Application Publication No. 2019/0112815, which is hereby incorporated by reference in its entirety, describes various examples of deicer solution compositions that may be used in the deicer system 10.

The water source 14 may take a number of forms. In an illustrative embodiment, the water source 14 may comprise a container or reservoir configured to hold or store water therein. In another embodiment, the water source 14 may alternatively or additionally comprise a water utility line or existing pressurized water source, such as a city water supply or a well water supply. As shown in FIG. 1, the water source 14 is in fluid communication with the mixer 16 via a fluid path 30 therebetween.

The mixer 16 is used to mix the deicer solution provided by the deicer solution source 12 with water provided by the water source 14 to form a deicer fluid. In at least some embodiments, the mixer 16 may be a passive mixer, such as, for example, that described in U.S. Patent Application Publication No. 2019/0112815 incorporated by reference above. In other embodiments, however, the mixer 16 may be an active mixer that uses electricity to power a motor or other component(s) that then move one or more elements of the mixer 16 in order to mix the deicer solution with the water. In such an embodiment, the mixer 16 may be electrically-coupled to an electric power source, such as, for example and without limitation, one or more batteries, a solar panel, a 120V power supply, or a 220V power supply.

While in the embodiment described above, a deicer solution and water are mixed together in the mixer 16, in other embodiments, one or more liquids or fluids may be used in place or in addition to the deicer solution and/or the water. And in yet another embodiment, the deicer solution source 12 may hold or store a pre-mixed deicer fluid, or a deicer solution may be mixed with water in the deicer solution source 12 to create the deicer fluid, thereby eliminating the need for the mixer and, in some embodiments, the water source 14. In such an embodiment, the deicer solution source 12 comprises the deicer fluid source 11 of the system 10.

In any event, the electronically-controlled valve 18 is configured to control the flow, the pressure, or the flow and pressure of deicer fluid to the dispenser 20 of the system 10. As such, in the embodiment illustrated in FIG. 1, the valve 18 is in fluid communication with both the mixer 16 and the dispenser 20 so that the deicer fluid produced by the mixer 16 passes from the mixer 16 through the electronically-controlled valve 18 and to the dispenser 20 when the electronically-controlled valve 18 is activated. As used herein, the electronically-controlled valve 18 is considered to be activated (or in the activated state) when the valve 18 is in a state in which fluid is permitted to pass from a fluid input of the valve 18 to a fluid output of the valve 18. Conversely, the electronically-controlled valve 18 is considered to be deactivated (or in the deactivated state) when the valve 18 is in a state in which fluid is not permitted to pass from the fluid input of the valve 18 to the fluid output of the valve 18.

In the embodiment illustrated in FIG. 1, the fluid input of the valve 18 is in fluid communication with a fluid output of the mixer 16, and the fluid output of the valve 18 is in fluid communication with the dispenser 20. In other embodiments wherein the system 10 does not include the mixer 16, the fluid input of the valve 18 may be in fluid communication with a fluid output of the deicer solution source 12, and the fluid output of the valve 18 is in fluid communication with the dispenser 20.

In one embodiment, the electronically-controlled valve 18 is a solenoid valve that is electronically controllable between the activated state and the deactivated state by the electronic controller 24. It will be appreciated, however, that in other embodiments, other types of valves that are electronically-controllable between an activated state and a deactivated state may be used. As shown in FIG. 1, the electronically-controlled valve 18 is electronically coupled to the controller 24 via a wired or wireless electronic connection 31. This electronic connection 31 is used to communicate an electronic signal from the controller 24 to the electronically-controlled valve 18 and/or from the electronically-controlled valve 18 to the controller 24. At least according to some embodiments, the controller 24 generates and sends one or more electrical signals representative of one or more commands to the electronically-controlled valve 18 via the electronic connection 31, which causes the electronically-controlled valve 18 to switch from the deactivated state to the activated state, or vice versa.

The dispenser 20 is used to dispense or deposit deicer fluid onto one or more surfaces of interest (represented as surface(s) "A" in FIG. 1), which may comprise, for example, a surface of a roof of a building, a surface of a gutter and/or downspout of a building, a ground surface, a road surface, an airport runway, a sidewalk, a driveway, a surface of a solar panel, a surface of a satellite dish, and/or other surfaces. The dispenser 20 includes one or more tubes 21 and one or more emitters 22. The tube(s) 21 is/are configured to fluidly connect the output of the valve 18 with the emitters 22, and the emitters 22, which are located proximate (e.g., adjacent to, on, or near) to the surface(s) of interest A, are configured to emit or deposit deicer fluid onto or near the surface(s) of interest when the valve 18 is activated. Accordingly, when the valve 18 is activated, deicer fluid flows from the deicer solution source 12, through the valve 18 and the tubes(s) 21 to the emitters 22 where it is deposited or dispensed onto or near the surface(s) of interest A. In some embodiments, one or more portions of the tube(s) 21 may include one or more holes or openings therein that comprise the emitter(s) 22. In such an embodiment, the portion(s) of the tube(s) 21 having the emitter holes comprise emitter tubing, whereas portions of the tube(s) 21 without the holes comprise non-emitter tubing. In other embodiments, however, rather than the tube(s) having holes that themselves comprise the emitter(s) 22, the emitter(s) 22 may comprise components that are separate from, and configured to be coupled with, the tubes 21, such as, for example, dispenser heads (e.g., sprinkler heads). In such an embodiment, one or more portions of the tube(s) 21 may comprise emitter tubing having holes therein each configured to receive a portion of a respective dispenser head to couple the dispenser heads with the tube 21. In such an embodiment, the dispenser heads may be used to direct and/or spray the deicer fluid in one or more particular directions. It should be appreciated that any suitable dispenser heads or other dispensing mechanisms may be used as the emitter(s) 22.

In some embodiments, the tube(s) 21 of the dispenser 20 may be rigid, while in other embodiments, some or all of the tube(s) 21 may be flexible. In the latter instance, the flexible tubes 21 may be formed of rubber or another flexible material, for example, an elastomeric plastic, to allow that or those tube(s) 21 to assume any number of arrangements or orientations to suit the application. For example, in at least some embodiments, one or more portions of the tube(s) 21 comprising emitter tubing may be arranged in coil to ensure more fluid is deposited onto or near a surface or area of interest, and one or more portions of the tube(s) 21 comprising non-emitter tubing may be more easily routed around corners or bends when installed.

Figure 2:
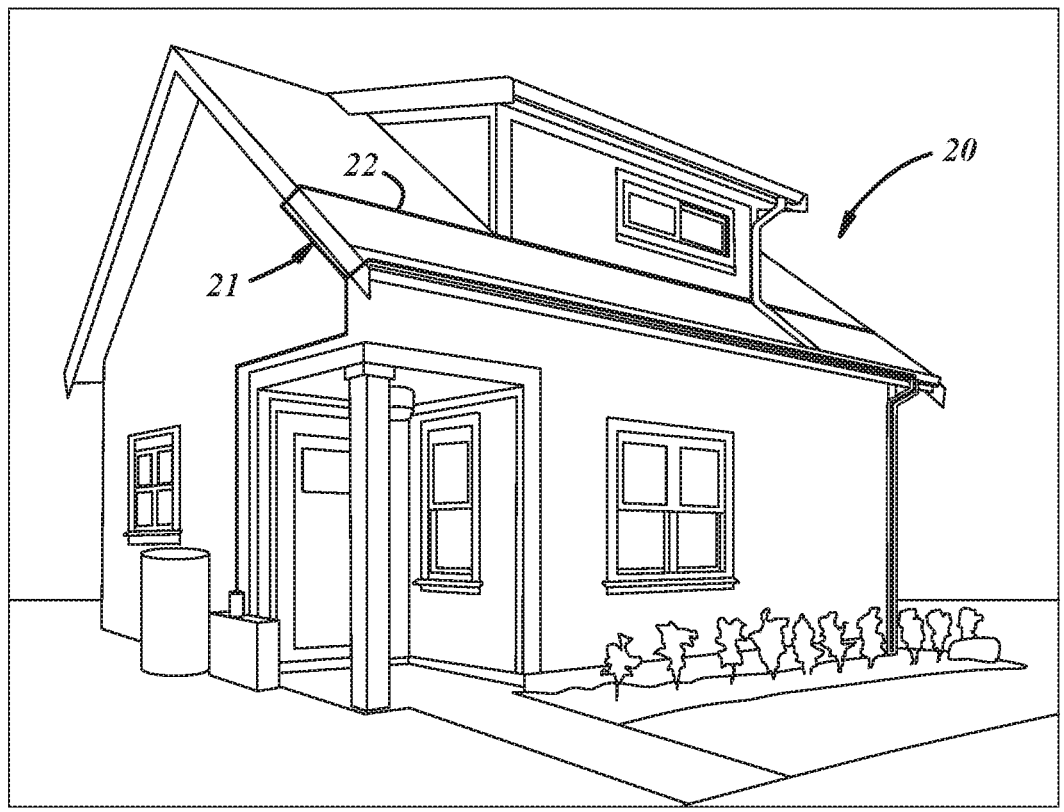
FIG. 2 is a diagrammatic view of a fluid deposition system applied to the outside of residential home.
Figure 3A:
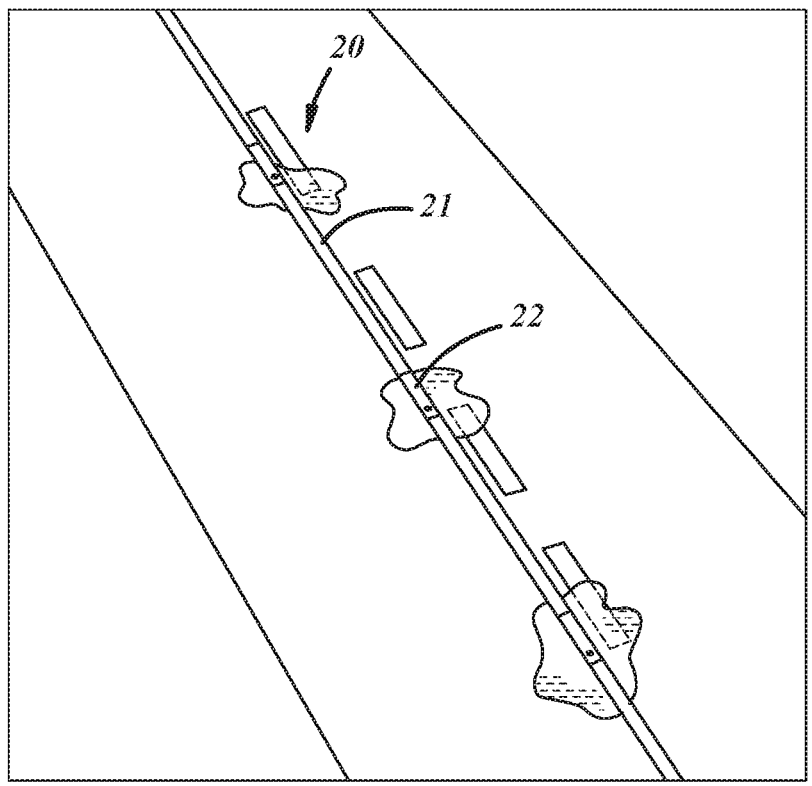
FIGS. 3A and 3B are diagrammatic views of a fluid deposition system applied to a roadway (FIG. 3A) or adjacent to a roadway (FIG. 3B)
Figure 3B:
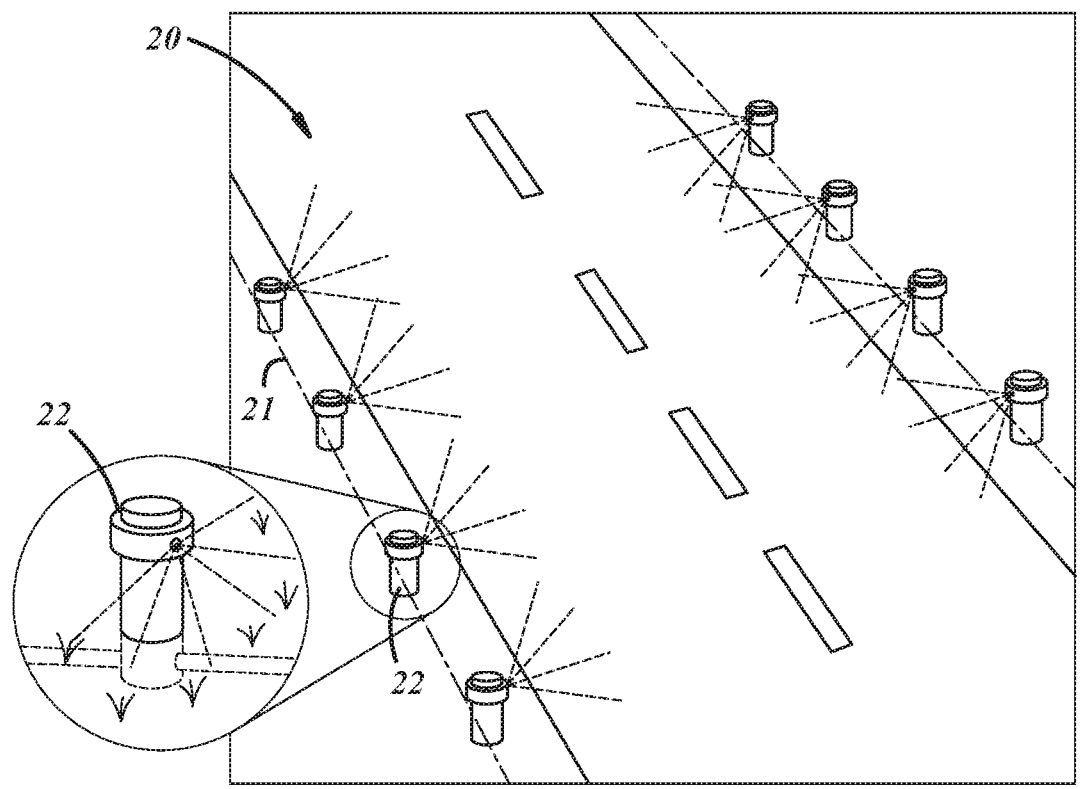
Figure 4:
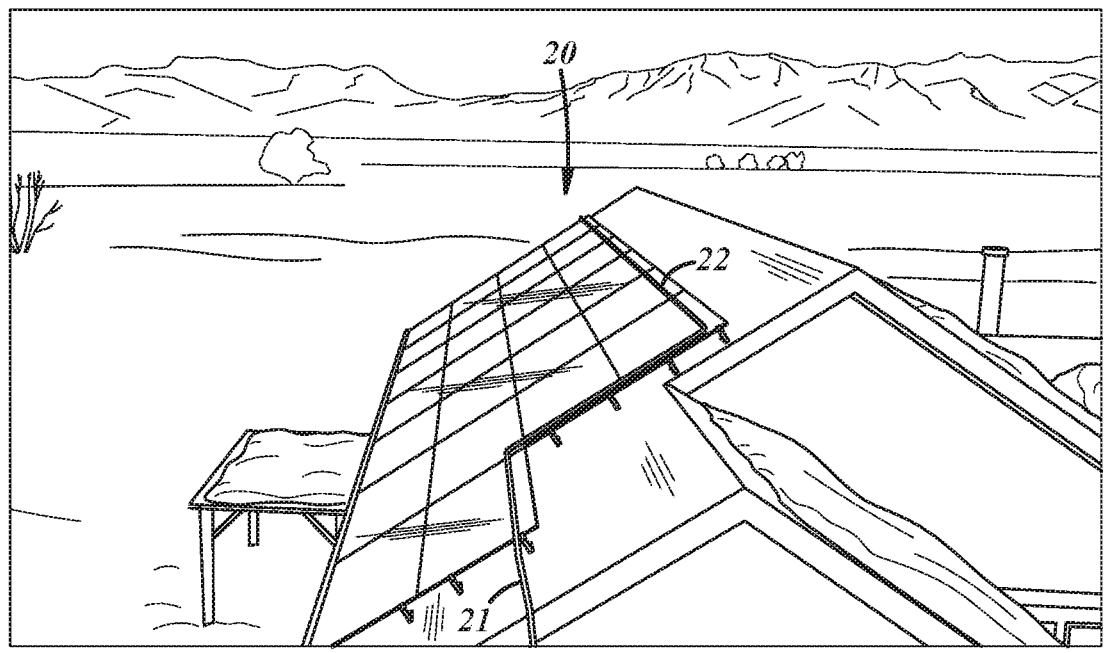
FIG. 4 is a diagrammatic view of a fluid deposition system applied to a solar panel.
Figure 5:
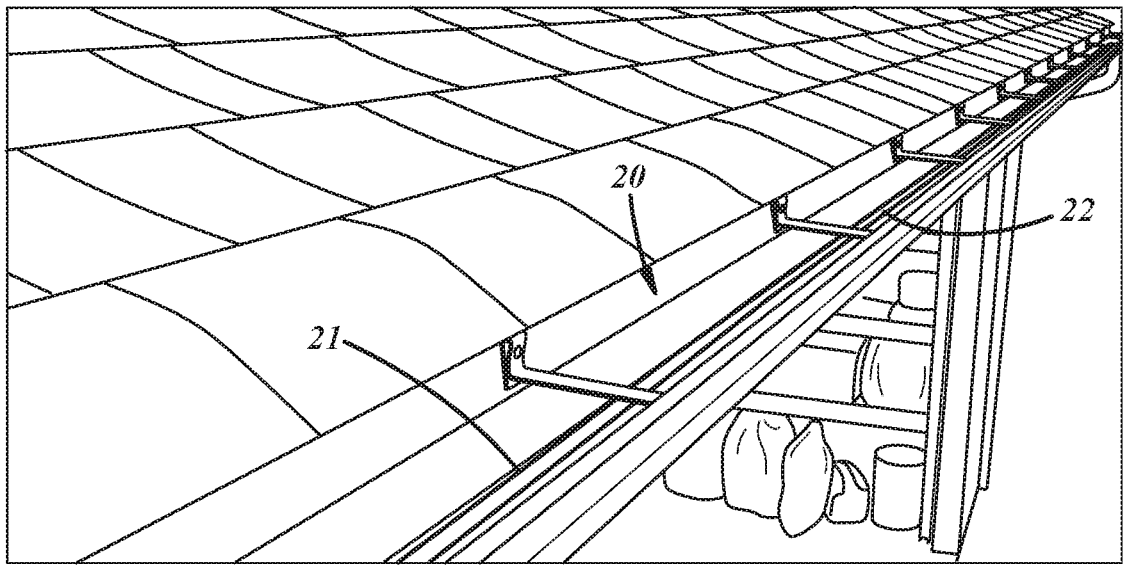
FIG. 5 is a diagrammatic view of a fluid deposition system applied to a gutter of a building.
Figure 6:
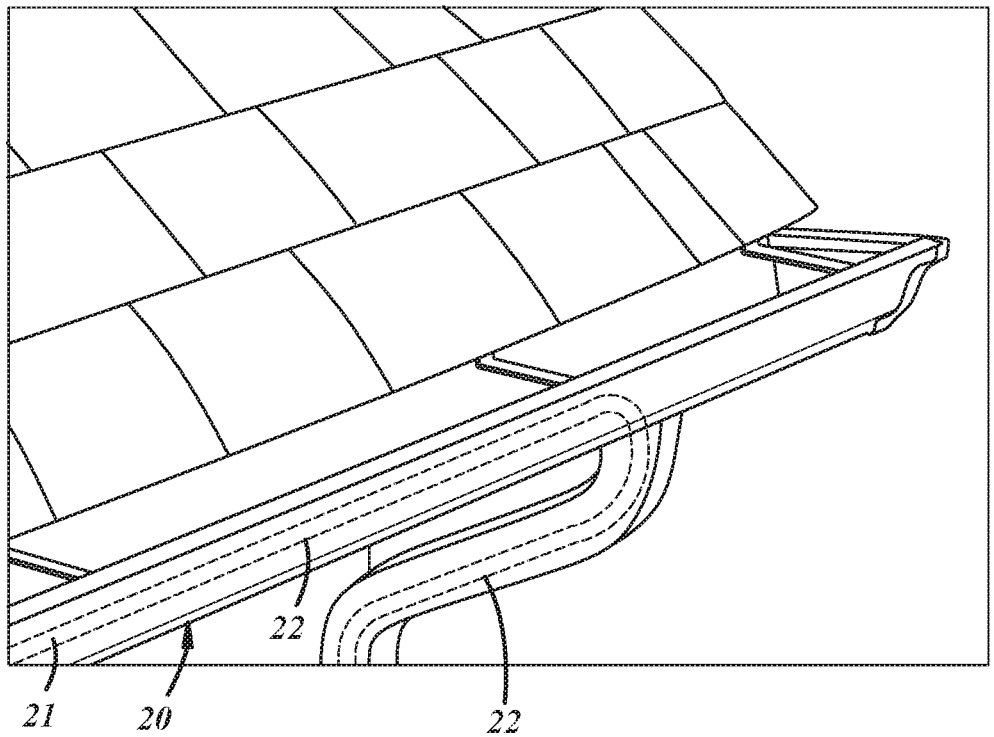
FIG. 6 is a diagrammatic view of a fluid deposition system applied to a gutter and a downspout of a building.

As described above, the system 10 may have a number of different applications, and as such, depending on the application, it is contemplated that the dispenser 20 may be disposed on or in close proximity to a number of different types of surfaces or areas of interest. By way of example, FIG. 2 illustrates an embodiment wherein the system 10 is used to dispense fluid onto a surface of the roof of a building, and in such an embodiment, the dispenser 20 is located on one or more surfaces of the roof. FIGS. 3A and 3B each illustrate a respective embodiment wherein the system 10 is used to dispense fluid onto a surface of a roadway or runway, and in such an embodiment, the dispenser 20 may be located either on the surface (FIG. 3A) or beside or adjacent to the surface (FIG. 3B). FIG. 4 illustrates an embodiment wherein the system 10 is used to dispense fluid onto a surface of a solar panel, and in such an embodiment, the dispenser 20 is located on a surface of the solar panel. FIG. 5 illustrates an embodiment wherein the system 10 is used to dispense fluid onto a surface of a gutter, and in such an embodiment, the dispenser 20 is located on a surface of the gutter. And FIG. 6 illustrates an embodiment wherein the system 10 is used to dispense fluid onto surfaces of both a gutter and a downspout of a building, and in such an embodiment, the dispenser 20 is located on a surface of the gutter and a surface of the downspout. Accordingly, it will be appreciated that the system 10 may have any number of applications and that the present disclosure is not intended to be limited to any particular application(s).

The controller 24 is an electronic controller that includes an electronic processor 34 that is configured to execute computer instructions that are stored on or in an electronic memory 36, which is accessible by the processor 34. The controller 24 may further include, for example, input/output (I/O) devices and/or other known components. Among other things, the controller 24 may be configured to control the electronically-controllable valve 18 as discussed above. According to the illustrated embodiment, the controller 24 is electronically connected to the network access device (NAD) 26, the electronically-controllable valve 18, and, as will be described below, one or more of the sensors 28, each via a respective electronic connection.

The electronic memory 36 includes computer instructions that, when executed by the processor 34, cause the controller 24 to carry out one or more operations, such as, for example, one or more of those that are used as a part of one or more of the methods described below. The processor 34, which may include one or more electrical inputs and one or more electrical outputs, may be any of a variety of devices capable of processing electronic instructions, including microprocessors, microcontrollers, host processors, and application specific integrated circuits (ASICs). The processor 34 may be a dedicated processor used only for the deicer system 10, or may be shared with other systems. For example, the controller 24 may be a smart-home controller or hub, such as an Amazon™ Echo™ or a Google™ Home™, and the processor 34 may carry out various functionality in addition to that specifically described herein. The processor 34 may execute various types of digitally-stored instructions, such as software or firmware.

The memory 36 may be any of a variety of electronic memory devices that can store a variety of data and information. This includes, for example, software, firmware, programs, algorithms, thresholds, scripts, and other electronic instructions that, for example, are required to perform or cause to be performed one or more of the functions described elsewhere herein. The memory 36 may comprises, for example, a powered temporary memory or any suitable non-transitory, computer-readable medium. Such examples can include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other component suitable for storing computer instructions used to carry out the various operations or functions discussed herein.

In at least some embodiments, the aforementioned instructions may be provided as a computer program product, or software, that may include a non-transitory, computer-readable storage medium. This storage medium may have instructions stored thereon, which may be used to program a computer system (or other electronic devices, for example, the processor 34) to implement some or all of the functionality described herein, including one or more steps of the one or more methods described below. A computer-readable storage medium may include any mechanism for storing information in a form (e.g., software, processing application) readable by a machine (e.g., a computer or processing unit). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical, or other types of medium suitable for storing program instructions. In addition, program instructions may be communicated using optical, acoustical, or other form of propagated signal (e.g., carrier waves, infrared signals, digital signals, or other types of signals or mediums).

In any event, although the controller 24 is described as having a single processor and memory that constitute the processor 34 and memory 36, respectively, in other embodiments, the controller 24 includes two or more processors and/or two or more memories. Moreover, although the controller 24 is described and referred to as a single device, in other embodiments, the functionality attributed to the controller 24 may be carried out by one or more other electronic devices, such as one or more other controllers, each of which includes a processor that is configured to execute computer instructions that are stored on memory accessible by the processor.

Each of the electronic connections between the controller 24 and other components of the system 10 (e.g., each of the electronically-controllable valve 18, the NAD 26, and the sensor(s) 28 described below) may be a hardwired connection or a wireless connection. The types of these various electronic connections may be different or the same as one another. Some exemplary hardwired connections that may be used are a controller area network (CAN) connection, a fiber connection, a coaxial cable connection, and an ethernet cable connection including an IEEE 802.3 connection. Some exemplary hardwired connections that may be used are a Wi-Fi™ connection (e.g., a Wi-Fi™ direct connection), other IEEE 802.11 connection, a Bluetooth™ connection (e.g., Bluetooth™ Low Energy (BLE) connection), other IEEE 802.15 connection, a ZigBee™ connection, a Zwave™ connection, a MiWi™ connection, and a cellular or other radio-based connection.

In an embodiment wherein the system 10 includes the NAD 26, the NAD 26 enables the controller 24 to communicate with remote networks and/or devices, such as via a wireless carrier system 102 and/or land network 106, as depicted in FIG. 3. The NAD 26 may include a router, a modem, other network interface controller or module, a processor (which may be separate from the processor 34 of the controller 24), memory (which may be separate from the memory 36 of the controller 24), and/or any other suitable component required to carry out the functionality of the NAD 26. In one embodiment, the NAD 26 includes a wireless communications device that enables wireless communications to be carried out. In one such embodiment, the wireless communications device may include a cellular chipset or other hardware components that enable long-range wireless communications, such as cellular communications that are carried out using the wireless carrier system 102 (shown in FIG. 7). In embodiments where the NAD 26 includes a wireless communications device, such as a cellular chipset, the NAD 26 may also include an antenna 38 as depicted in the illustrated embodiment. Additionally, or alternatively, the wireless communications device of the NAD 26 may include short-range wireless communication (SRWC) circuitry or other hardware components that enable short-range wireless communications, such as Wi-Fi™ or Bluetooth™. In some embodiments, the NAD 26 may include a modem and/or other hardware enabling hard-wired communications to be carried out, such as, for example, long-distance wired communications. In one embodiment, the NAD 26 enables both wired and wireless communications. In other embodiments, the NAD 26 enables either only wired communications or only wireless communications. Also, it should be appreciated that, according to some embodiments, the NAD 26 and the controller 24 each have a separate processor and/or memory while in other embodiments, the NAD 26 and the controller 24 share the same processor and/or memory.

In some embodiments, the NAD 26 includes a radio frequency (RF) transceiver that is used to carry out wireless communications using RF signals. In other embodiments, the RF transceiver may be electrically connected to the controller 24, and the NAD 26 may be separate from the RF transceiver. However, in such embodiments, the RF transceiver and the controller 24 may still be communicatively coupled to the NAD 26—for example, the NAD 26 may provide a wireless access point (e.g., a Wi-Fi access point) and the RF transceiver may connect thereto. This may be used to allow the controller 24 to connect to the NAD 26 via a wireless connection between the RF transceiver and the NAD 26 thereby enabling the controller 24 to connect to one or more remote devices, such as the remote data server 112, via the RF transceiver and the NAD 26.

Figure 7:
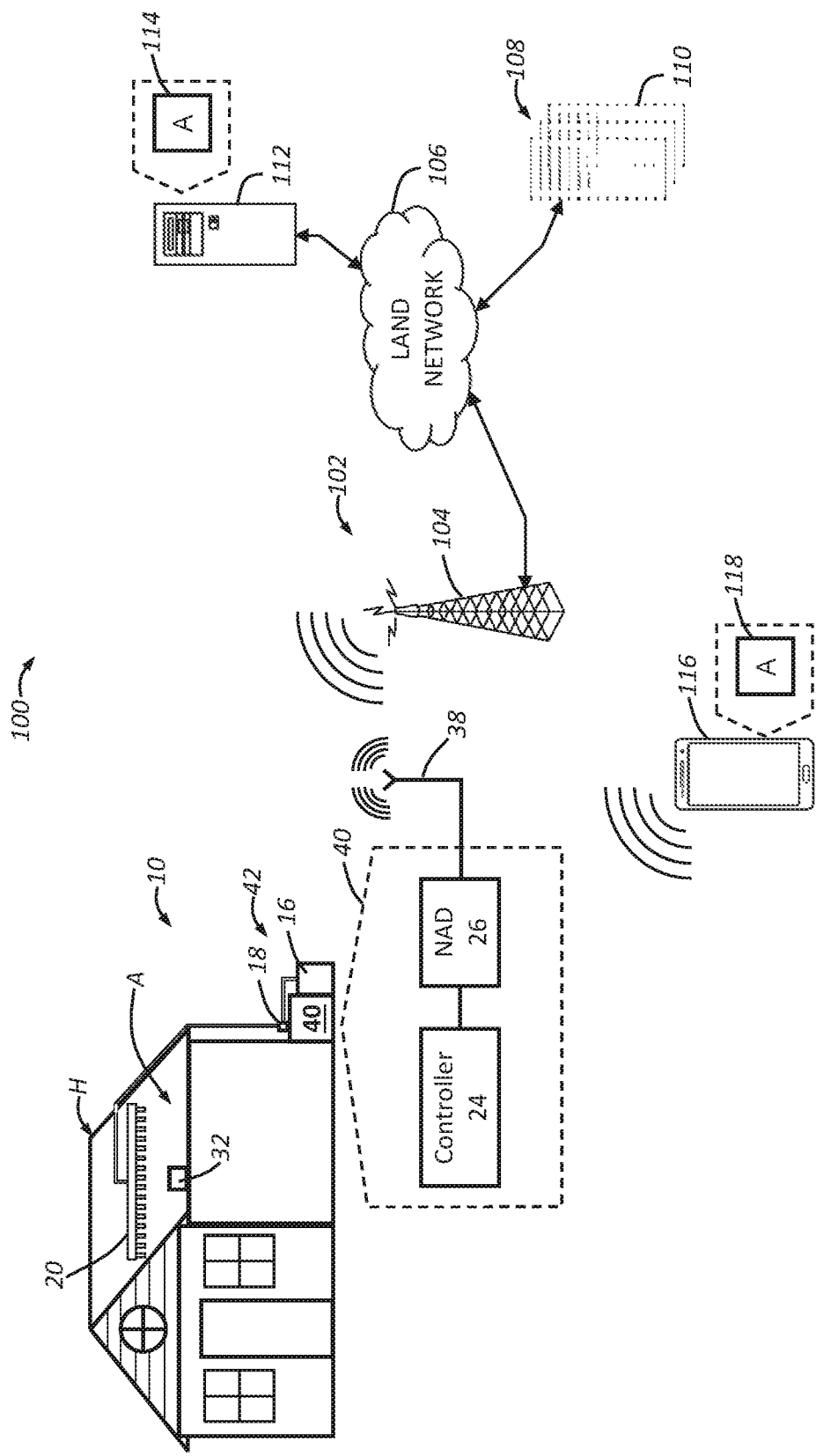
FIG. 7 is a block diagram of an illustrative embodiment of a sensor package that is used as a part of the system shown in FIG. 1.

The RF transceiver may be used to carry out wireless communications with, for example and without limitation, one or more of the sensors 28 of the deicer system 10. For example, the controller 24 may send a sensor data request to one or more sensors 28 via the RF transceiver and, in response to receiving the sensor data request, the one or more sensors 28 may send a sensor data response in the form of one or more electrical signals representative of the sensor data or information. According to one embodiment, the controller 24 may be configured to send a sensor data request according to a predetermined interval or schedule based on system operating parameters, such as in response to determining that one or more operating parameters exceed a predetermined threshold. In another embodiment, the controller 24 may be configured to send a sensor data request in response to receiving an indication to obtain sensor data from a remote device, such as from one or more servers 110 of the remote data system 108 and/or the remote data server 112 (FIG. 7).

As briefly described above, the system 10 may include one or more sensors 28, each of which may be electronically connected to and configured for communication with (e.g., via a wired or wireless connection) the electronic controller 24 and/or one or more other components that are part of the system 10 or configured for use with the system 10 (e.g., the remote server system 108, the remote data server 112, etc.). The sensors 28 may comprise any number of different sensors, components, devices, modules, systems, etc., and may provide the electronic controller 24 with information or input that can be used, for example, in the monitoring, control, and operation of the system 10.

Each of the sensors 28 may be configured to monitor, sense, detect, measure, or otherwise determine a variety of information relating to, for example, the environment in which the system 10 is operating, the operation of the system 10, and/or the performance of the system 10. For example, each of the sensors 28 may be configured to determine or provide information relating to one or more of: weather-related conditions, for example, wind patterns (speed and direction), atmospheric pressure and density, cloud coverage, humidity, temperature, evaporation, radiation, frost coverage, and dew point; the amount of ice on an area or surface of interest; the amount of water on an area or surface of interest; the water level in a gutter; the volume of runoff in a drain; the concentration of deicing fluid in the runoff in a drain; the formation of channels in a build-up of ice or snow; the formation of icicles; the flow rate of fluid at one or more points in the system 10, for example, at the valve 18 or the emitters 22; the fluid pressure at one or more points in the system 10 (e.g., at the fluid source 11, the valve 18, the emitter(s) 22); the amount of fluid in the water source 14; the amount of fluid in the deicer solution source 12; the amount of fluid in a deicer fluid source 11 (e.g., in the mixer 16 or dedicated deicer fluid source) the amperage or power consumption; the amount of fluid in a drain, receipt, or catch basin; the number of messages sent by a component of the system 10 to the cloud (or remote network); the number of successful connections to a local deicer system network; the number of failed connections to the local deicer system network; the number of successful connections to the cloud (or remote network); and the number of failed connections to the cloud (or remote network), among others.

In any event, the sensor(s) 28 may include, for example, and without limitation, one or more of: pressure sensors, temperature sensors (e.g., ambient temperature sensors, surface temperature sensors, etc.), humidity sensors, moisture sensors, conductivity sensors, wind sensors, ultraviolet (UV) sensors, infrared (IR) sensors, photoresistors, cameras (and associated image processing components known in the art), tactile sensors, resistive touch sensors, capacitive touch sensors, ultrasonic sensors, lidar sensors, radar sensors, strain gauge sensors, load cell sensors, flow sensors, power meters, and fluid level sensors.

The sensor(s) 28 may be configured to provide information that may be used by the system 10 (and the electronic controller 24, in particular) or a user of the system to determine when to activate the system (e.g., when to initiate fluid deposition) and/or to deactivate the system (e.g., when to stop depositing fluid), information to monitor and evaluate the operation of the system that may be used by the electronic controller 24 or user as feedback to determine whether operating parameters of the system 10 need to be adjusted (e.g., increase or decrease flow rate of fluid and/or increase or decrease the pressure of the fluid in the system 10 (e.g., at the fluid source 11), and/or information that may be used by the electronic controller 24 or user to evaluate the performance (e.g., effectiveness) of the system 10 and to determine whether adjustments to the system 10 are needed. The sensor(s) 28 identified above, as well as any other suitable sensors not specifically identified above but that may provide information that can be used by the system 10, may be embodied in hardware, software, firmware or some combination thereof. The sensor(s) 28 may directly sense or measure the data/conditions/information for which they are provided, or they may indirectly evaluate such conditions/information based on information provided by other sensors, components, devices, modules, systems, etc.

In an embodiment, one or more of the sensor(s) 28 may comprises a standalone component, while in other embodiments, one or more of the sensor(s) 28 may be provided as a sensor package 32, which is discussed in below with respect to FIG. 8. As used herein, a sensor package is any module that has a housing and that includes at least one sensor 28 and an electronic communications device, such as an RF transceiver, that is used to communicate sensor data or information obtained by the at least one sensor 28 to one or more other components of the system 10 or components that are not part of the system 10 but configured for communication with the at least one sensor 28.

Depending on, for example, the particular number and/or type(s) of sensors 28 the system 10 includes, the sensor(s) 28 may be located at a variety of locations of the system 10. In an embodiment wherein the system includes a plurality of sensors 28, the sensor(s) 28 may be located at a common location or may distributed throughout the system 10. For example, one or more sensors 28 may be located at or near the same location at which one or more of the deicer solution source 12, the water source 14, the mixer 16, and the electronic controller 24 are located, while one or more other sensors may be located at different locations throughout the system or at locations proximate to the system 10, for example, at or near the surface(s) of interest A (e.g., sensor package 30 in FIG. 1), at the emitters 22, or at any other suitable location. Accordingly, it will be appreciated that the system 10 may include any number of sensors 28, any number of types of sensors, and the sensors 28 may be located at any number of locations.

According to some embodiments, the deicer system 10 may include a housing 40 that houses one or more components of the deicer system 10. As shown in the illustrated embodiment of FIG. 1, the housing 40 houses at least part of the controller 24, the NAD 26, and one or more of the sensors 28. In other embodiments, the housing 40 may house other components instead of or in addition to those shown in FIG. 1, or fewer than all of the components identified above. The housing 40 may be comprised of any suitable housing material, such as various types of plastics and metals that are not permeable to environmental elements, such as snow and rain. In an embodiment, the housing 40 may include an inner cavity that is hermetically-sealed relative to an exterior of the housing 40 so that the components housed therein are protected from environmental elements, such as snow and rain. The housing 40 may include any number of suitable access features that permit an element or component to pass from the interior cavity to the exterior of the housing 40, such as for enabling an electrical cable or wire to pass therethrough from an electrical port of the controller 24 to one of the sensors 28 remote from the housing 40 or for permitting a portion of one of the sensors 28 in the housing, such as a thermocouple or other sensing element thereof, to be disposed outside of the housing 40.

The components that are housed within the housing 40 may be part of a main unit 42 of the system 10 that acts as the central data processing center of the system 10. The main unit 42 may further include any one or more of the deicer solution source 12, the water source 14, the mixer 16, and/or the electronically-controllable valve 18. In FIG. 1, the main unit 42 is shown as including the housing 40 (and the components housed therein) as well as the deicer solution source 12, the water source 14, the mixer 16, and the electronically-controllable valve 18. The main unit 42 may also include a main housing 44 that encloses to all or some of the components that are a part of the main unit 42. An electric power source may be provided to power some or all of the electronic components of the main unit 42, including those that are housed in the housing 40, for example, the controller 24, the NAD 26, and one or more of the sensors 28. The power source may be any suitable electric power source, such as, for example and without limitation, one or more batteries, a solar panel, a standard 120V power supply, or a 220V power supply.

FIG. 8 depicts an illustrative embodiment of the sensor package 32 that may include one of the sensors 28, a processor 46, memory 48, a radio frequency (RF) transceiver 50, an RF antenna 52, a power source 54, and a housing 56. Although the sensor package 32 is described as including one sensor 28, it should be appreciated that the sensor package 32 may include more than one sensor 28. Also, although the illustrated embodiment only includes one sensor package 32, it should be appreciated that the deicer system 10 may include any suitable number of sensor packages 32 located at any number of locations throughout the system 10.

In at least one embodiment, the processor 46 may be used to collect sensor data from the sensor 28 that is part of the sensor package 32, process the sensor data, organize or package the sensor data into a proper format for communicating the sensor data to the controller 24 or one or more other components with which the sensor package 32 is in configured for communication, and then to send the packaged sensor data to the appropriate component in the form of one or more electrical signals representative of the sensor data. In other embodiments, the processor 46 may be used to carry out one or more, but not all, of those steps/functions. The memory 48 includes computer instructions that are executable by the processor 46 and that, when executed, cause the processor 46 to carry out certain operations, such as those described above. The processor 46 may be any suitable types of processors, such as those types described above with respect to the processor 34 of the controller 24. The memory 48 may be any suitable type of memory, such as one or more of those types described above with respect to the memory 36 of the controller 24.

The RF transceiver 50 is used to carry out communications with the controller 24 via, for example, the NAD 26, which may include an RF transceiver. The RF antenna 52 is used to transmit and receive data via wireless communications. In other embodiments, such as those where the NAD 26 does not include an RF transceiver, a different type of electronic data connection may be used, such as any of those described above, including, for example, any of a variety of wireless or wired electronic data connections. In such embodiments, the sensor package 32 may include a modem, a network interface card/circuitry, or other suitable network interfacing circuitry that operates to send electronic data. In one embodiment, this network interfacing circuitry may be used in place of the RF transceiver 50. The network interfacing circuitry may be connected to a cable that extends from the sensor package 32 to the NAD 26, which may also include such network interfacing circuitry so as to enable wired electronic data communications. In one embodiment, the sensor package 32 may include both wired and wireless communication capabilities so that both a wired electronic data connection and a wireless electronic data connection may be used.

The power source 54 is an electric power source that is used to power the electronic components of the sensor package 32, including one or more of the sensors 28, the processor 46, the memory 48, and the RF transceiver 50. The power source 54 may be any suitable electric power source, such as, for example and without limitation, one or more batteries, a solar panel, a standard 120V power supply, or a 220V power supply. The sensor package 32 may also include a mounting device or mechanism, such as a clip, a flange with a bolt hole, hook and loop fastener, or adhesive, that may be used to secure the sensor package 32 to, for example, a surface or area of interest.

With respect to FIG. 7, there is shown an embodiment of a communications system 100. In an embodiment, the communications system 100 may include the deicer system 10, which is shown installed on a residential building (referred to herein as a house H), and a wireless carrier system 102 having one or more cellular towers 104, a land communications network 106, a remote server system 108 having one or more servers 110, a remote data server 112 having a data server application 114, and a client device 116 (illustrated as a handheld mobile device in FIG. 3) having a client application 118. It will be appreciated, that in other embodiments, the communications system 100 may include more or less than those components identified above. For example, in some embodiments, the communications system 100 may only include the wireless carrier system 102 and the land communications network 106, with the deicer system 10, the remote server system 108, the remote data server 112, and the client device 116 being separate from, and configured for use with, the communications system 100. And, in at least one embodiment, the remote server system 108, the remote data server 112, and/or and the client device 116 are not part of the communications system 100, and one or more of these components are actually part of the deicer system 10.

It should also be appreciated that although the deicer system 10 is shown in FIG. 3 as being installed on a house, the deicer system 10 may be installed on a variety of different types of buildings, including commercial buildings, such as those that include a flat roof, or on structures other than buildings, for example, roadway, satellite dishes, solar panels, etc.

The wireless carrier system 102 may be any suitable cellular data or telephone system. The wireless carrier system 102 is depicted in FIG. 7 as including a single cellular tower 104; however, the wireless carrier system 102 may include additional cellular towers as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect wireless carrier system 102 with the land network 106 or to connect the wireless carrier system with user equipment (UEs, e.g., which include the NAD 26 and the client device 116). The wireless carrier system 102 may implement any suitable communications technology, including for example GSM/GPRS technology, CDMA or CDMA2000 technology, LTE technology, etc. In general, the wireless carrier system 102, its components, the arrangement of tis components, the interaction between the components, etc. is generally known in the art.

The land communications network 106 (or "land network" for short) may be a conventional data communications network that provides connectivity to between remote devices, and that can be used to connect the wireless carrier system 102 to one or more networks or devices that are remote to one another, such as the deicer system 10, the remote server system 108, the remote data server 112, and the client device 116. In one embodiment, the land network 106 includes a packet-switched data communications network that is used to provide access to Internet infrastructure or the cloud (referred to herein collectively as the cloud). One or more segments of the land network 106 may be implemented through the use of a standard wired network, a fiber or other optical network, a cable network, power lines, other wireless networks such as wireless local area networks (WLANs), or networks providing broadband wireless access (BWA), or any combination thereof.

The remote server system 108 provides the deicer system 10 with back-end or remotely-executed functionality. The remote server system 108 may be "remote" in the sense that it is not provided at the location where the deicer system 10 is used—for example, with respect to the illustrated embodiment of FIG. 3, the deicer system 10 is provided at the house H and the area with the area of interest A being a portion of the roof of the house H. The remote server system 108 is located at another location, such as a remote server facility that houses the remote server system 108 and that may also house other server systems. In other instances, however, the remote server system 108 may be "remote" in the sense that it is not located in the same enclosure or housing as the electronic controller 24 but rather is a distance away from the controller 24 (e.g., a matter of inches, feet, or miles). In any event, the remote server system 108 may carry out communications with, for example, the NAD 26 of the deicer system 10, one or more sensors 28, and/or one or more sensor packages 32 via a remote data connection, which may include an Internet or other connection used for communicating data between remotely-located devices. The remote data connection may include use of one or more communication protocols, such as, for example, HTTP (which is considered herein as including any extensions thereof, such as HTTPS), WebSocket, and/or FTP protocols. Although the remote server system 108 is discussed as being located at a single remote facility, it should be appreciated that the remote server system 108 may be distributed among two or more remote facilities.

The remote server system 108 is shown as including three servers 110 (each of which is considered a "remote server"), but may include any suitable number of servers, such as a single server, two servers, etc. The remote server system 108 may also include various components and may be a part of a wired or wireless local area network. The one or more remote servers 110 each include a processor and memory. The memory can store computer instructions that, when executed by the processor, carry out various functionality, such as the functionality discussed as being attributed to the remote server system 108. In one embodiment, the one or more remote servers 110 support an API interface that is used to provide the client device 116 with control of one or more components of the deicer system 10. In such embodiments, this server is referred to as an API server. The remote server system 108 may also include other computers or computing devices, as well as other memory, databases, etc. Generally, the remote server system 108 may receive and transmit data via a modem connected to the land network 106. At the remote server system 108, data transmissions may also be conducted by wireless systems, such as IEEE 802.11x, GPRS, and the like. In one embodiment, the remote server system 108 may be used to implement at least part of one or more methods disclosed herein. A database at the remote server system 108 may store sensor information (e.g., sensor data obtained directly or indirectly from one or more of the sensors 28) and/or various other types of data that is used by the deicer system 10 and/or method(s) discussed below.

In at least some embodiments, for example, an embodiment wherein the deicer system 10 is part of the larger communications system 100, or an embodiment wherein the remote server system 108 is part of the deicer system 10, the remote server system 108 may be configured to perform various functionality described herein as being performed by the controller 24, including, for example and without limitation, one or more steps of the method described below (e.g., the remote server 108 may be configured to perform some of the steps of the method, while the controller 24 may be configured to perform other of the steps; or the remote server 108 may be configured to perform all of the steps of the method). In such an embodiment, the electronic controller 24 may receive information, instructions, or commands from the remote server system 108 and perform or cause to be performed certain tasks in response thereto (e.g., turn a pump on or off, open or close the valve 18, etc.). The controller 24 may also be configured to perform additional basic functions of the system 10 such as timing and exerting a measure of control over components in the system 10. Additionally, in an embodiment wherein the remote server system 108 is configured to perform some or all of the functionality of the deicer system 10, the electronic controller 24 may also be configured to determine if a connection with the remote server system 108 is lost, and if so, to perform the functionality the remote server system 108 is configured to perform.

The remote data server 112 is a remote server and is "remote" in the sense that it may not provided at the location where the deicer system 10 is used. In other instances, however, the remote data server 112 may be "remote" in the sense that it is not located in the same enclosure or housing as the electronic controller 24 but rather is a distance away from the controller 24 (e.g., a matter of inches, feet, or miles). The remote data server 112 is separate from the remote server system 108 and, in at least some embodiments, the remote data server 112 is located remotely from the remote server system 108. The remote data server 112 includes a processor and memory. The memory can store computer instructions that, when executed by the processor, carry out various functionality, such as the functionality discussed as being attributed to the remote data server 112. In an embodiment, the remote data server 112 is used to provide data to the deicer system 10, such as for purposes of determining operating parameters of the deicer system 10. The remote data server 112 may be an application programming interface (API) that is accessible via a remote data connection, which may include use of one or more communication protocols, such as, for example, HTTP (which is considered herein as including any extensions thereof, such as HTTPS), WebSocket, and/or FTP protocols.

In one embodiment, the remote data server 112 is used to provide weather data pertaining to a geographic area or region in which the deicer system 10, or at least certain components thereof (e.g., the dispenser 20) is/are located. The weather data, or any other information provided by the remote data server 112, may be provided to the controller 24 (or other component of the deicer system 10) via the NAD 26 and/or the remote server system 108. In one embodiment, the remote data server 112 may host a computer program that is configured to utilize APIs of other services, for example and without limitation, AccuWeather™, OpenWeather™, Google™, Google Maps™, and Amazon Web Services™, to access the weather data.

The weather data may include forecasted weather information or data and/or current weather information or data. Forecasted weather data includes weather conditions or events that are predicted to occur in the future.

In an embodiment, forecasted weather data (e.g., predicted weather conditions) may be obtained from, for example, sources external to the system 10, for example and without limitation, one or more of those identified above (e.g., AccuWeather™, OpenWeather™ Google™, Google Maps™, Amazon Web Services™, weather stations, other deicer systems located in other geographic areas, etc.).

In other embodiment, the remote data server 112 may be configured to determine the forecasted weather data itself by using information or data relating to the real-time current weather/environmental conditions where the system 10 is located and/or at one or more areas remote from where the system 10 is located (e.g., within a predetermined distance from the system, within a predetermined distance range, etc.). In such an embodiment, the remote data server 112 may be configured to obtain, retrieve, or otherwise receive the required weather/environmental data (e.g., data from one or more of the sensors 28, in an instance where current weather/environmental conditions where the system 10 is located is used, data from other deicer systems located in other geographic areas, weather stations, weather services, etc., in instances where current weather/environmental conditions at areas remote from where the system 10 is located, etc.) and, using one or more models or algorithms with the obtained data, determine the forecasted weather data. In other embodiments, rather than or in addition to the remote data server 112 being configured to determine the forecasted weather information, one or more other components, for example, the controller 24 and/or one of the remote servers 110, may be configured to determine the forecasted weather information.

In any event, the forecasted weather data may be used by, for example, the electronic controller 24 or the remote data server 112 to determine and set operating parameters of the system and/or to determine whether and when to deposit fluid on one or more area(s)/surface(s) of interest in anticipation of certain weather events or conditions, which may be a part of predictive activation/initiation scheme(s) used by the deicer system 10 and described in greater detail below.

Unlike forecasted weather data that relates to weather conditions or events predicted to occur in the future, current weather data relates to weather data collected from one or more of the sensors 28 of the system 10, weather stations, or other weather services and relating to real-time weather conditions where the system 10 is located. As with the forecasted weather data, the current weather data may be used to determine and set operating parameters of the system 10, such as those used for responsive activation/initiation scheme(s) of the deicer system 10 and described in greater detail below.

In at least some embodiments, for example, an embodiment wherein the deicer system 10 is part of the larger communications system 100, or an embodiment wherein the remote data server 112 is part of the deicer system 10, the remote data server 112 may be configured to perform various functionality described herein as being performed by the controller 24, including, for example and without limitation, one or more steps of the method described below (e.g., the remote data server 112 may be configured to perform some of the steps of the method, while the controller 24 may be configured to perform other of the steps; or the remote data server 112 may be configured to perform all of the steps of the method). In such an embodiment, the electronic controller 24 may receive information, instructions, or commands from the remote data server 112 and perform or cause to be performed certain tasks in response thereto (e.g., turn a pump on or off, open or close the valve 18, etc.). The controller 24 may also be configured to perform additional basic functions of the system 10 such as timing and exerting a measure of control over components in the system 10. Additionally, in an embodiment wherein the remote data server 112 is configured to perform some or all of the functionality of the deicer system 10, the electronic controller 24 may also be configured to determine if a connection with the remote data server 112 is lost, and if so, to perform the functionality the remote data server 112 is configured to perform.

The client device 116 is a device (e.g., computing device) that is used by a user of the deicer system 10 for interacting with the deicer system 10, including viewing information pertaining to the operation of the deicer system 10. Although the client device 116 is illustrated as being a handheld mobile device, it should be appreciated that other suitable devices may be used, such as, for example, a laptop, a desktop computer, a tablet, a smart phone, a smartwatch, etc. Moreover, although the communications system 100 is discussed herein as including one client device 116, the communications system 100 may include any suitable number of client devices 116, according to various embodiments. The client device 116 may be configured for communication with the remote server system 108 and/or the deicer system 10, such as the controller 24 of the deicer system 10 via the NAD 26.

The client device 116 may include a cellular chipset for carrying out wireless communications, such as cellular communications. The client device 116 may use the cellular chipset for communicating with other components of the communications system 100 and/or the deicer system 10, such as the controller 24 of the deicer system 10 and/or the remote server system 108 of the communications system 100. The client device 116 may also include short-range wireless communication (SRWC) circuitry enabling SRWC technologies to be used to send and receive data. The client device 116 may use the SRWC circuitry to communicate with the controller 24 via the NAD 26 of the deicer system 10. In another embodiment, the client device 116 is a computer that is not a handheld mobile device, such as a desktop computer. In such cases, the client device 116 may connect to the NAD 26 using wired communications, such as via an Ethernet cable connected therebetween.

The client device 116 includes a processor, memory accessible by the processor, and a network access device communicatively coupled to the processor. According to at least some embodiments, the client device 116 includes one or more human-machine interfaces (HMIs), such as, for example, a computer screen or display, a computer mouse, a keyboard, a microphone, a knob, a wheel, a dial, a keypad, a light (e.g., a light emitting diode (LED)), and/or a speaker. According to at least one embodiment, the client device 116 executes a client application 118 that is used to display a graphical user interface (GUI) that is used for providing a means for the user to interact with the deicer system 10 and/or other components of the communications system 100, such as the remote server system 108 and/or the remote data server 112. The user may interact with the GUI via a touchscreen of the client device 116 or via any other suitable HMI, such as those described above. The client device 116 may receive input from the user (e.g., instructions to activate the system or to adjust one or more operating parameters of the system), as well as visually present sensor data of the deicer system 10 and/or other information relating to the deicer system 10 to the user, including, for example, how well the deicer system 10 is performing. In one embodiment, the client application 118 may be a web application that is executed by a web browser of the client device 116, and the computer instructions embodying the client application 118 (and which may be used to provide the GUI) may be provided by the remote server system 108. In another embodiment, the client application 118 may be downloaded to the client device 116 and then executed using an operating system of the client device 116. In one embodiment, the client application 118 may be downloaded from a remote computer, such as the remote server(s) 110. In some embodiments, the client application 118 is downloaded from a digital distribution platform, such as the iOS App Store™, Google Play™, etc.

In some embodiments, the user may use the client application 118 to control the operation of the deicer system 10, such as setting or adjusting certain operating parameters and/or to initiate or activate the deicer system 10 so as to cause the deicer system 10 to deposit fluid onto or near a one or more areas or surfaces of interest. The GUI of the client application 118 may be used to control the operation of the deicer system 10. For example, the GUI may be used to receive user input that indicates one or more operating parameters, such as the volume of deicer fluid to deposit, the frequency of carrying out the fluid deposition execution step, the type of initiation scheme used, an algorithm or equation for determining one or more operation parameters, and/or sensor conditions or other initiation conditions used as a part of the initiation scheme (e.g., one or more predetermined threshold values or other predetermined values used as a part of a deposition cycle process, which is described below). For example, a user can input a command to emit a certain amount of fluid (e.g., 200 mL) once every certain number of minutes or hours (e.g., 4 hours) and a certain amount of fluid (e.g., 600 mL) any time snow is detected. The client application 118 may also enable the user to override an ongoing deposition cycle process, such as to stop execution of an ongoing fluid deposition execution step. For example, the client application 118 may receive user input indicating to stop execution of an ongoing fluid deposition execution step and send an indication of this user input to the controller 24 of the deicer system 10, such as by way of remote communications (e.g., via wireless carrier system 102, land network 106, and/or remote data system 108) and/or local communications (e.g., via a local wireless electronic data connection (e.g., Wi-Fi™, Bluetooth™) between the client device 116 and the NAD 26). Any other deicer system control input by the user into the client device 116 may be carried out in a similar manner, including either via a local or remote electronic connection.

Although the client device 116 is shown and described as being a handheld mobile device, such as a smartphone, in other embodiments, the client device 116 may be integrated into the main unit 42 of the system 10 and/or may use the controller 24 or another controller of the main unit 42. For example, in certain embodiments, a dedicated user interface may be provided for the deicer system 10, which is a user interface that includes hardware components (e.g., HMI(s)) designed specifically for the deicer system 10 rather than a general computer (e.g., a smartphone) that is designed to more generally be used to implement various functionality for various unrelated systems. In a dedicated user interface for the deicer system 10, one or more HMIs may be connected to the controller 24 so that the controller 24 may receive input from a user via HMI(s), such as via a knob, switch, microphone, touchscreen, keypad, etc., and/or provide output to a user via HMI(s), such as via one or more indicator lights (e.g., LED lights), electronic displays (e.g., liquid crystal display (LCD)), speakers, etc. The dedicated user interface enables the user to control the deicer system 10 as described above. In one embodiment, the HMI(s) of the dedicated user interface includes one or more indicator lights that indicate a power status of the deicer system 10 (e.g., whether battery levels are low) and/or an operating status of the deicer system 10 (e.g., whether a water source level or amount is low, whether a deicer solution source level or amount is low). The dedicated user interface may be integrated into the housing 40 that houses the electronic controller 24, the housing 44 that houses various components of the system 10, or may include its own housing that is separate from the housing 40 and/or housing 44. The dedicated user interface may be hardwired to the controller 24 so as to be in electronic communication with the controller 24 so that inputs received at the HMI(s) of the dedicated user interface are received or communicated to the controller 24. In another embodiment, the dedicated user interface is wirelessly connected via a wireless electronic data connection to the controller 24, such as via Bluetooth™ and/or Wi-Fi™. In some embodiments, the dedicated user interface may be mounted to a wall or other structure of a building (e.g., the interior or exterior wall of a house or other residence), such as, for example, in a manner similar to that typically used for residential thermostats. It should be appreciated that the features and functionality of the dedicated user interface may be implemented and carried out as a part of the GUI of the handheld mobile device and that the discussion of the features and functionality of the GUI of the handheld mobile device be implemented and carried out as a part of the dedicated user interface.

With reference to FIG. 9, there is shown an illustrative embodiment of a method 200 of operating a fluid deposition system. In an embodiment, the fluid deposition system is a deicer system, for example, the deicer system 10 described above. Although the following discussion of the method 200 is primarily with respect to a deicer system, it should be appreciated that the method 200 may find application with any number of different types of fluid deposition systems including at least one or more of those systems identified elsewhere herein, and thus, except as otherwise provided herein, it will appreciated that the method 200 is not limited to use in connection with any particular type(s) of fluid deposition system(s).

In an embodiment, the method 200 comprises a fluid deposition cycle process, which is a process for depositing fluid that includes one or more cycles of carrying out a fluid deposition execution step during which fluid is deposited onto the area of interest.

In at least one embodiment, the steps of the method 200 are carried out by the controller 24 of the system 10 (e.g., the electronic processor 34 thereof). However, in other embodiments, some or all of the steps of the method 200 may be carried out by one or more other components of the deicer system 10 and/or the communications system 100. For example, in some embodiments, one of the servers 110 of the remote data system 108 or the remote data server 112 may be configured to perform some or all of the steps of method 200, or one or more of the servers 110 or the remote data server 112 may be configured to perform some of the steps (e.g., steps 210 and/or 220 described below) with the electronic controller 24 being configured to perform other of the steps (e.g., step 230 described below). Accordingly, it will be appreciated the method 200 may be performed by one or a combination of components (e.g., one or a plurality of electronic processors), and thus, that the present disclosure is not intended to be limited to method 200 being carried out or performed by any particular component(s) or particular components being configured to perform any particular steps. Additionally, it will be appreciated that unless otherwise noted, the performance or execution of method 200 is not meant to be limited to any one particular order or sequence of steps; rather the steps may be performed in any suitable and appropriate order or sequence and/or at the same time.

In an embodiment, the method 200 includes a step 210 of determining whether or when to initiate a fluid deposition execution step 230 of the method 200, which comprises depositing fluid on one or more areas/surface(s) of interest. In an embodiment, the determination being made in step 210 comprises determining whether one or more predetermined conditions or criteria are met for initiating the deposition of fluid on or near one or more areas or surfaces of interest.

The determination in step 210 of whether to initiate a fluid deposition execution step may be made according to one or more initiation schemes, depending on the particular implementation of the method 200. These initiation schemes may include, for example, a responsive or reactive initiation scheme, a predictive initiation scheme, an independent initiation scheme, or a hybrid initiation scheme which may comprise a combination of two or more of the responsive, predictive, and independent initiation schemes. In at least some embodiments, the type of initiation scheme used to determine whether to initiate a fluid deposition execution step may also be used in a step 220 of the method 200 to determine one or more operating parameters of the system 10, as will be discussed in great detail below.

A responsive or reactive initiation scheme is an initiation scheme implemented by a responsive algorithm executed by the controller 24 that is based on data or information relating to current or real-time conditions, for example and without limitation, the current state of the environment (e.g., current environmental conditions), the system 10 (e.g., system performance), and/or other conditions at the area of interest. As such, the responsive initiation scheme is used to cause the deicer system 10 to carry out a fluid deposition execution step in response to the current state of the environment, the deicer system 10, and/or other identified conditions at the area of interest. In some embodiments, responsive algorithms use real-time information or data obtained from, for example, one or more of the sensors 28 or another source that is part of or external to the system 10, for example, one or more of those identified elsewhere herein (e.g., weather stations, weather services, etc.), to determine the current state of the environment, the system 10, or other conditions, and based thereon, whether one or more initiation criteria are met.

An example of a responsive algorithm includes determining whether the current ambient temperature measured by one of or more of the sensors 28 is less than (or, in an embodiment, less than or equal to) a particular threshold temperature, greater than (or, in an embodiment, greater than or equal to) a particular threshold temperature, and/or some combination thereof. For example, the electronic controller 24 may obtain the current ambient temperature (e.g., via one or more electrical signals representative of the ambient temperature received from one or more of the sensors 28) and a responsive algorithm may be used to determine whether that current ambient temperature is less than a predetermined threshold value stored in, for example, the memory 36 of the controller 24, and if so, to determine that an initiation criterion is met. In another example, a responsive algorithm may be used to determine whether the current ambient temperature is both greater than a first predetermined temperature threshold and less than a second predetermined temperature threshold that is greater than the first predetermined threshold, and if so, to determine that an initiation criterion is met. In any event, if it is determined that the required initiation criteria are met, it is determined in step 210 that a fluid deposition execution step is to be carried out.

While in the example above initiation criteria was based on current ambient temperature, it will be appreciated that any number of other types of data or information may additionally or alternatively be used, for example and without limitation, information relating to conditions of or at (or near) the surface of interest itself and/or the performance of the system 10, such as, for example: the temperature(s) at different points of interest on a surface or area of interest; a measure of an amount of ice on a surface or area of interest; a measure of an amount of water on a surface or area of interest; the presence and/or amount of snow on a surface or area of interest; the presence, size, and/or number of channels formed in a build-up of ice or snow on or near the surface or area of interest; and the presence, size, and/or number of icicles formed at or near the area or surface of interest, to name just a few.

In any event, data or information used by the responsive algorithms may be collected or retrieved in a variety of ways, including, but not limited to, one or more of the sensors 28, online or cloud-based weather application programming interfaces (APIs), and/or other cloud or otherwise remotely-accessible networks via, for example, the NAD 26. In at least one embodiment where a responsive or reactive initiation scheme is used, this step includes obtaining present or current sensor data from one or more of the sensors 28 of the deicer system 10. This may include the controller 24 sending a sensor data request to one or more of the sensors 28 and, in response, receiving a sensor data response in the form of one or more electrical signals representative of present or current sensor data from the sensor 28. Alternatively, the sensor(s) 28 may be configured to continuously or periodically provide the information to the controller 24 without being requested to do so.

By way of example, the following are non-limiting examples of criteria or conditions that may be used as a part of the responsive initiation scheme to determine whether to initiate the fluid deposition execution step, but in no way constitutes a comprehensive or complete list of the conditions/criteria that may be used: the ambient temperature, as detected by an ambient temperature sensor, is between, for example, −10° C. and 5° C.; the atmospheric pressure, as detected by a pressure sensor, is less than, for example, 767 mmHg; the ambient humidity level, as detected by a humidity sensor, is greater than, for example, 80%; the presence of moisture on an area of interest as detected by a moisture sensor; conductivity of fluid (e.g., water) being greater than, for example, two (2) micro-Siemens conductivity as detected by a conductivity sensor measuring fluid passing therethrough; winds greater than, for example, 30 mph as detected by a wind sensor; an ultraviolet (UV) index of less than, for example, two (2) as detected by a UV sensor; presence of snow on the roof as detected by an infrared (IR) reflection sensor that is configured to detect IR light from the sun that is reflected off of snow on an area of interest; presence of snow during the daytime as detected by a photoresistor that is configured to detect the presence of snow based on the amount of light incident thereon; presence of snow as detected by a tactile pressure sensor that is mounted at or near (e.g., on) an area or surface of interest and that is configured to infer the presence of snow when the sensor measures pressure above a particular threshold value; a depth of snow on an area or surface of interest as detected by an ultrasonic distance sensor that is aimed downward at the area or surface of interest; presence of snow as indicated by a three-dimensional point cloud generated by a lidar sensor, where the three-dimensional point cloud represents an area or surface of interest and whatever snow or precipitation may be on the area of interest; presence of snow by using a radar sensor mounted on top of an area or surface of interest that is configured to reflect radio waves off of the surface of the snow and/or the area of interest; a 1-10% increase in the weight of a roof (or other structure supporting or comprising an area or surface of interest) as detected by a strain gauge sensor or a load cell sensor mounted to the structure supporting or comprising the area or surface of interest; an amount of standing water (or other fluid) being above a predetermined threshold value (or, simply, the presence of standing water), which may be detected by a camera or standing water sensor, such as a sensor that measures the distance from a surface of the area of interest to a floating component that floats on water (or other similarly-dense fluid); and presence of icicles on or near the area or surface of interest, which may be detected by a camera.

Whereas the responsive or reactive initiation scheme described above relies on uses real-time or current information (e.g., current state of the environment or deicer system) to determine in step 210 whether to initiate a fluid deposition execution step, a predictive initiation scheme is an initiation scheme implemented by a predictive algorithm executed by the controller 24 that is based on data or information indicating a predicted condition, for example, a predicted state of the environment (e.g., predicted environmental conditions) and/or the deicer system 10. As such, the predictive initiation scheme is used to cause the deicer system to carry out a fluid deposition execution step in anticipation of a predicted state of the environment and/or deicer system 10. In some embodiments, the predicted state of the environment and/or the deicer system 10 may be based on forecasted weather data or information, other forecasted data or information, and/or projected probabilities of one or more aspects of the state of the environment and/or the deicer system, which may be obtained by the system 10 and the electronic controller 24 thereof, in particular, as described elsewhere herein, and may be used to determine whether one or more initiation criteria are met.

An example of a predictive algorithm is one that determines whether the probability of precipitation (e.g., snow, rain, etc.) is greater than (or, in an embodiment, greater than or equal to) a particular threshold value, less than (or, in an embodiment, less than or equal to) a particular threshold value, and/or some combination thereof. For example, the electronic controller 24 may obtain the probability of precipitation (e.g., via one or more electrical signals representative of the probability of precipitation) and a predictive algorithm may be used to determine whether the probability of precipitation for the day (or for a given period of time in the future) is greater than a particular predetermined threshold value stored in, for example, the memory 36 of the controller 24, and if so, to determine that an initiation criterion is met. In any event, if it is determined that the required initiation criteria are met, it is determined in step 210 that a fluid deposition execution step is to be carried out.

While in the example above initiation criteria was based on the probability of precipitation, it will be appreciated that any number of other types of data or information may additionally or alternatively be used, for example, and without limitation, the predicted or forecasted ambient temperature being less than (or, in an embodiment, less than or equal to) a particular threshold temperature, greater than (or, in an embodiment, great than or equal to) a particular threshold temperature, and/or some combination thereof. Accordingly, the present disclosure is not limited to the use of any particular predicted environment-related condition(s) in determining in step 210 whether to initiate a fluid deposition execution step using a predictive initiation scheme.

The data or information used by the predictive algorithms may be collected or retrieved in a variety of ways, including, but not limited to, online or cloud-based weather application programming interfaces (APIs) and/or other cloud or otherwise remotely-accessible networks via, for example, the NAD 26. In at least one embodiment where a predictive initiation scheme is used, this step includes obtaining forecasted or predicted weather conditions relating to the geographic area or location where the system 10, or at least certain components thereof (e.g., the dispenser 20) is/are located. This may include the controller 24 sending a request for the information and, in response, receiving the information in the form of one or more electrical signals representative of the predicted or forecasted weather conditions. Alternatively, the information may be periodically provided to the controller 24 without the electronic controller 24 requesting it.

In other embodiments, rather than collecting or retrieving information used by the predictive algorithms from external sources, one or more of the components of the system 10 (e.g., the controller 24, one of the remote servers 110, the remote data server 112, etc.) may be configured to determine forecasted or predicted weather conditions relating to the geographic area or location where the system 10 is located. More particularly, in some embodiments, the electronic controller 24, one of the servers 110, or the remote data server 112 may be configured to determine the forecasted weather data itself by using information or data relating to the real-time current weather/environmental conditions where the system 10 is located and/or at one or more areas remote from where the system 10 is located (e.g., within a predetermined distance from the system, within a predetermined distance range, etc.). In such an embodiment, the controller 24, remote server(s) 110, or remote data server 112 may be configured to obtain, retrieve, or otherwise receive the required weather/environmental data (e.g., data from one or more of the sensors 28, in an instance where current weather/environmental conditions where the system 10 is located is used, data from other deicer systems located in other geographic areas, weather stations, weather services, etc., in instances where current weather/environmental conditions at areas remote from where the system 10 is located, etc.) and, using one or more models or algorithms with the obtained data, determine the forecasted weather data.

Unlike the responsive and predictive initiation schemes that are dependent upon current or predicted conditions relating to, for example, the state of the environment and/or the deicer system 10, the independent initiation scheme is an initiation scheme implemented by an independent algorithm that is not dependent on a state of either the environment or the deicer system 10. For example, an independent algorithm may determine whether a particular amount of time has passed or elapsed since last initiating the deicer system 10, since last carrying out a fluid deposition execution step, and/or since the performance of another operational step of the deicer system 10, and if so, determine that an initiation criterion is met. Accordingly, in an embodiment, an independent initiation scheme may cause a fluid deposition execution step to be carried out according to a particular predetermined time interval or schedule, such as, for example, every certain number of minutes or hours.

While in the example above temporal initiation criteria was used, it will be appreciated that any number of other types of data or information may additionally or alternatively be used. For example, in an embodiment, an independent initiation algorithm may determine whether a user input to initiate or activate the system has been received (e.g., via a GUI or HMI of the system, the turning of a valve, the pressing of a button), and if so, to determine that an initiation criterion has been met. In another embodiment, an independent initiation algorithm may determine that a command has been received from the remote server system 108, the remote data server 112, or another source, and to determine that an initiation criterion has been met. Accordingly, the present disclosure is not limited to the use of any particular data or information in determining in step 210 whether to initiate a fluid deposition execution step using an independent initiation scheme.

As mentioned above, a hybrid initiation scheme may also be used as the initiation scheme in step 210. The hybrid initiation scheme combines two or more of the responsive, predictive, and independent initiation schemes described above. In one embodiment, the hybrid initiation scheme may combine or be based on a responsive initiation scheme and a predictive initiation scheme. For example, it may be determined in step 210 to cause a fluid deposition execution step to be to be carried out when the ambient temperature is below a predetermined threshold value and the probability of precipitation is above a particular threshold value. Of course, this is but one example as other particular initiation conditions or criteria may be used as a part of the hybrid initiation scheme.

In any event, if it is determined in step 210 that the fluid deposition execution step 230 is to be carried out, in at least some embodiments, method 200 moves to step 230 described below. In other embodiments, however, the method 200 may proceed to step 220. Conversely, if it is determined in step 210 that the fluid deposition execution step 230 is not to be carried out, the method ends and/or step 210 may be repeated.

In step 220, one or more operating parameters for the system 10 are determined for use in the fluid deposition execution step. More specifically, in step 220, values to be used for one or more operating parameters, for example, the volume of deicer fluid to be deposited, the flow rate of the deicer fluid, the pressure of the deicer fluid at the fluid source, the amount of time to deposit the deicer fluid, and other like parameters, are determined. The values for the one or more operating parameters may be determined based on sensor data or information and/or other data or information retrieved or obtained by the deicer system 10 and, in at least some embodiments, the electronic controller 24 thereof, in particular. The values for the one or more operating parameters may be based on predetermined or hard-coded values stored in, for example, the memory 36 of the controller 24, sensor data obtained from one or more of the sensors 28, and/or data or information received from one or more other sources (e.g., information or data received from the remote server system 108 or the remote data server 112 at the controller 24 via the NAD 26).

In one embodiment, the type of initiation scheme used in step 210 dictates the type of data to be used in determining the values of the operating parameter(s) in step 220. For example, when step 210 is carried out according to an independent initiation scheme, step 220 may comprise obtaining predetermined values for the operating parameter(s) from a data structure stored in or on the memory 36 of the controller 24. Alternatively, step 220 may comprise obtaining predefined values of certain operating parameters of the system 10 other than the operating parameter(s) for which values are determined in step 220, and then using that or those predefined values to calculate values for the one or more operating parameters for which values are being determined in step 220.

For example, in an instance wherein the volume of deicer fluid to be emitted or dispensed is determined in step 220, the memory 36 may store a predetermined value representing a volume of deicer fluid that is to be emitted, and so step 220 may comprise accessing the memory 36 and obtaining that value or obtaining the value from another source, for example, the remote server system 108 or the remote data server 112. In another embodiment, the volume of deicer fluid to be used may be calculated using another operating parameter of the system 10. For example, in an embodiment, the volume of deicer fluid that is to be emitted may be calculated using equation (1):

$$\text{Vol.} = A \times (\text{length of emitter tubing}) \qquad (1)$$

where "A" is an empirically derived constant that, in an embodiment, may be determined based on the design of the system and experimentation and that may be hard-coded or subject to change in software updates, and the length of tubing is the known length of one or more portions of the tube(s) 21 comprising emitter tubing, which may be expressed in feet, meters, etc. In an illustrative embodiment, the constant "A" is 1.33. In a particular example, the length of the emitter tubing is expressed in feet and the volume of deicer fluid that is to be emitted is expressed in milliliters (mL).

In another example, when step 210 is carried out according to a responsive initiation scheme, step 220 may comprise obtaining sensor data or information indicating a current state of the environment, such as the ambient temperature, or other conditions at the area of interest, to determine values for one or more operating parameters (e.g., volume of deicer fluid to be emitted). For example, in an instance wherein the volume of deicer fluid is determined in step 220, the volume of deicer fluid that is to be emitted may be determined using equation (2):

$$\text{Vol.} = \max(B \times (\text{ambient temperature}), C) \times (\text{length of emitter tubing}) \qquad (2)$$

where each of "B" and "C" is an empirically derived constant that, in an embodiment, may be determined based on the design of the system and experimentation and that may be hard-coded or subject to change in software updates, and the length of tubing is the known length of one or more portions of tube(s) 21 comprising emitter tubing, which may be expressed in feet, meters, etc. In an illustrative embodiment, the constant "B" has a value of (−0.4), the constant "C" has a value of 0.67, and the length of the emitter tubing is a predetermined or predefined value stored in the memory 36. In a particular example, the length of the emitter tubing is expressed in feet, the ambient temperature is expressed in degrees Celsius, and the volume of deicer fluid that is to be emitted is expressed in milliliters (mL).

As another example, when the step 210 is carried out according to a predictive initiation scheme, step 220 may comprise obtaining weather data indicating a predicted state of the environment, such as, for example, the probability of precipitation, to determine values for one or more operating parameters (e.g., volume of deicer fluid to be emitted). For example, in an instance where the volume of deicer fluid to be emitted is determined in step 220, the volume of deicer fluid that is to be emitted may be determined using equation (3):

$$\text{Vol.} = D \times (\text{probability of precipitation}) \times (\text{length of emitter tubing}) \qquad (3)$$

where "D" is an empirically derived constant that, in an embodiment, may be determined based on the design of the system and experimentation and that may be hard-coded or subject to change in software updates, and the length of tubing is the known length of one or more portions of tube(s) 21 comprising emitter tubing, which may be expressed in feet, meters, etc. In an illustrative embodiment, the constant "D" is 1.33. The probability of precipitation may be obtained from the remote data server 112, which may be a weather service API. In another embodiment, the probability of precipitation may be obtained from the remote data system 108, such as from one of the server(s) 110—in such an embodiment, the remote data system 108 may retrieve the weather data from the remote data server 112 and then provide this weather data to the controller 24 (or other component of the system 10). In a particular example, the length of the emitter tubing is expressed in feet, the probability of precipitation is expressed as a percentage (e.g., where 0.1 represents 10%), and the volume of deicer fluid that is to be emitted is expressed in milliliters (mL).

In an embodiment wherein an equation such as, for example, equations (1), (2), or (3) are used to determine values for one or more operating parameters (e.g., volume of deicer fluid to be emitted), in at least some embodiments, a gain may be applied to the equation to take into account one or more additional factors that are to be considered in determining the operating parameter value (e.g., volume). One such factor is an intensity level that may be set by a user of the system by interacting with a GUI or HMI of the system 10, for example, a GUI or HMI displayed on the client device 116. The intensity level corresponds to a desired level of response of the system 10 when the deposition of fluid is desired. For instance, the intensity level may be adjusted within a given range (e.g., 1-10, with "1" being the lowest intensity level and "10" being the highest intensity level) depending on whether the user wants to have a more or less intense or aggressive response to weather conditions. By way of example, if the user desires a less intense response where fluid is conserved, then a lesser volume of fluid will be needed (e.g., 1-4 mL of fluid per foot of tubing 21). If the user desires a more intense response where system performance is enhanced, then a volume of fluid that is greater than that in fluid conservation response is needed (e.g., 4-8 mL/ft). And if the user desires an intense response where total obliteration of the ice is the goal, then a volume of fluid that is greater than both the fluid conservation and enhanced performance responses is needed (e.g., 8 mL/ft or more). In any event, in an embodiment, the operating parameter value calculated using the given equation may, in an embodiment, be multiplied by the intensity level to provide a scaled value to account for the user's desired response.

While the examples described above describe the use of equations to calculate the value of an operating parameter of the system 10, the present disclosure is not intended to be limited to such a way of determining the values of the operating parameters. For example, in other embodiments, information relating to one or more operating parameters other than that or those for which values are being determined in step 220 and/or conditions at the area of interest (e.g., environmental conditions) may be looked up in a data structure (e.g., look-up table) that correlates the information with the value(s) of the one or more operating parameters for which values are being determined in step 220. Accordingly, the present disclosure is not intended to be limited to any particular way of determining operating parameter values in step 220.

While the description thus far has been with respect to determining values of one or more operating parameters of the system 10 based largely on environment-related conditions and/or other operating parameters of the system 10, in some embodiments, information or data related to other conditions at the area of interest and/or the performance of the system may also or alternatively be used in step 220 to determine one or more operating parameters of the system. More specifically, in an embodiment, information relating to the effectiveness of the system, for example, the amount of ice on an area of interest, the amount of water on an area of interest, the water level in a gutter, the amount of snow on an area of surface, the volume of runoff in a drain, the concentration of deicing fluid in the runoff in a drain, the size, number, and/or quality of channels formed in a build-up of ice or snow, the formation of icicles, and the like, following a previous iteration of the method 200, may be obtained or received by the controller 24 from, for example, one or more sensors 28 or another component of the system 10. That information may then be processed or evaluated by the electronic controller 24 and used to determine a value for one or more operating parameters of the system 10.

For example, based on the information received or obtained, the controller 24 may determine a volume of deicer fluid to be emitted or dispensed. One way this determination may be made is by first comparing the information relating to the performance of the system with the same information from a previous point in time (i.e., a previous iteration of the method 200 or at least one or more steps thereof). If, based on the comparison, there is no change in the information, or at least not enough of a change, then the controller 24 may increase the volume of the deicer fluid that is to be emitted. Conversely, if, based on the comparison, there is a change in the information and, in an embodiment, there is enough of a change, then the controller 24 may determine that the volume of deicer fluid that was emitted in the immediately previous iteration of the method 200 is to be maintained, or may reduce the volume. In either event, the controller 24 may be configured to determine the magnitude of the change in the information and then compare that magnitude with one or more predetermined thresholds or threshold ranges corresponding to different volume amounts to determine the volume to be used. It will be appreciated, however, that other ways of determining the volume may certainly be used instead, including, for example, using a data structure correlating the magnitude of change with volume amounts, calculations, and any other of a number of suitable ways.

While step 220 has thus far been described with respect to determining the volume of deicer fluid to be emitted in step 230, the present disclosure is not intended to be limited to the determination of such an operating parameter of the system 10 in step 220, and values for additional or alternative operating parameters may certainly be determined in step 220. Other operating parameters for which values may be determined in step 220 in addition to or in lieu of the volume of deicer fluid that is to be emitted may include, for example, and without limitation, a frequency or interval at which to emit deicer fluid, an amount of time for which to emit deicer fluid, a pressure at which to emit deicer fluid, and a rate at which to emit deicer fluid. Accordingly, the present disclosure is not intended to be limited to the determination of values for any particular operating parameter(s) in step 220.

It should be appreciated that while the description above has been primarily with respect to the controller 24 determining the values of the one or more operating parameters in step 220, in other embodiments, this determination may be made by another component of the system 10 or a device that is separate from but in communication with the system 10. For example, in an embodiment, the remote data system 108 of the communication system 100 may determine the values for the one or more operating parameters using, for example, the equations above, and then may send one or more messages having the values of the one or more operating parameters to the controller 24. In any event, following the determination of the values for the one or more operating parameters of the system 10 in step 220, the method 200 may then proceed to step 230.

In step 230, deicer fluid is caused to be deposited onto an area or surface of interest. In an embodiment wherein method 200 includes step 220, this step, which may be referred to herein as a fluid deposition execution step, is carried out according to the one or more operating parameters determined in step 220. For example, in an embodiment wherein the volume of deicer fluid to be emitted is determined in step 220, step 230 comprises emitting or depositing that volume of deicer fluid onto or near the area or surface of interest. In one embodiment, step 230 includes the controller 24 generating and sending one or more electrical signals representative of one or more commands to one or more components of the system 10 to cause fluid to be deposited. In an embodiment, this may comprise generating and sending one or more activation signals to one or more components of the system 10 (e.g., one or more of the electronically-controlled valve 18, a pump, or other suitable component) that activate(s) the component(s) to cause the fluid to be deposited onto the area of interest. For example, step 230 may comprise generating and sending one or more activation signals to the electronically-controlled valve 18 via the electronic connection between the controller 24 and the electronically-controlled valve 18. The activation signal, when received at the electronically-controlled valve 18, causes the electronically-controlled valve 18 to switch from the deactivated state to the activated state thereby causing the fluid input and the fluid output of the electronically-controlled valve 18 to be in fluid communication, and allowing the fluid to flow therethrough. In one embodiment, this fluid deposition execution step further includes activating a pump that causes pressure to be exerted in the fluid communication path such that the deicer fluid is forced through the electronically-controlled valve 18 and to the dispenser 20, and thus, the emitters 22. In other embodiments, the fluid communication path may be sufficiently pressured (e.g., via a passive mixing system or because a pump is already activated or has been activated so as to create a pressure differential) such that a pump need not be activated as a part of this step. Following the deposition of the fluid, method 200 ends.

In at least some embodiments, method 200, or at least certain steps thereof (e.g., step 210) may be repeated after a predetermined amount of time. For example, after a certain period of time (e.g., a certain number of minutes or hours) following the ending of an immediately previous iteration of the method 200, another iteration of the method 200 may be carried out and may start with step 210, wherein it is determined whether to initiate the deicer system 10. During the interim period or interval between the iterations of the method 200, the controller 24 may obtain data or information from, for example, one or more of the sensors 28 which may be used to evaluate conditions or criteria as a part of determining whether to initiate another iteration of the method 200 and/or as a part of determining one or more operating parameters for use in a future fluid deposition execution step. Additionally or alternatively, during this interim period, the controller 24 may obtain weather data from one or more sources (e.g., the remote data server 112), which may be used to evaluate conditions or criteria as a part of determining whether to initiate another iteration of the method 200 and/or as a part of determining one or more operating parameters for use in a future fluid deposition execution step.

While the description thus far has been primarily with respect to a system and method for depositing deicer fluid on or near one or more areas or surfaces of interest, the system 10 and method 200 may lend themselves to different applications. One such application relates to the cleaning or washing of an area or surface of interest (e.g., a surface of a roof of a building, a surface of a gutter and/or downspout of a building, a ground surface, a road surface, an airport runway, a sidewalk, a driveway, a surface of a solar panel, a surface of a satellite dish, and/or another like surfaces). In such an application, rather than the fluid source 11 of the system 10 comprising a deicer fluid source, the system 10 may include a cleaning fluid source that may comprise a reservoir in which soap or another cleaning agent or solution may be stored. For example, the deicer solution source 12 may be replaced with a cleaning agent solution source that stores a cleaning agent solution that is mixed with water by the mixer 16. Further, in at least some embodiments, the emitters 22 of the dispenser 20 may comprise high-pressure emitters to allow for the power-washing of the area or surface of interest. And instead of determining whether to initiate the depositing of deicer fluid in step 210 of method 200, step 210 includes determining whether to initiate the depositing of cleaning fluid based on whether one or more predetermined conditions or criteria are met (e.g., the presence and/or amount of debris, dirt, grime, or other undesirable articles or things (e.g., leaves, sticks, etc.) at the area of interest, environmental conditions (e.g., rain, snow, wind), etc.). Similarly, step 220, if applicable, would include determining one or more operating parameters of the system to be used in the depositing of cleaning fluid based on similar factors and in similar ways as those described above (e.g., based on conditions at the location of interest (e.g., the presence and/or amount of debris, dirt, grime, or other things at the area of interest), environmental conditions, other operating parameters of the system, etc.) Finally, rather than depositing deicer fluid in step 230, step 230 would comprise depositing cleaning fluid. Otherwise, in at least some embodiments, the composition and functionality of the system 10 and method 200 described above applies here with equal force, and as such, the description above will not be repeated but rather is incorporated here by reference in its entirety.

Another application relates to the use of the system 10 and method 200 to detect leaks in an area or surface of interest. More specifically, the system 10 may be configured to deposit fluid in one or more areas of interest (e.g., gutters, downspouts, etc.). In such an embodiment, system 10 may include a dye source in which dye may be stored. This dye source may be in addition to in place of a deicer fluid source 11 or one or both of the water source 14 and the deicer solution source 12. The system 10, and the electronic controller 24, in particular, may be configured to determine how much fluid is emitted by the system when performing a test for leaks by, for example, emitting a known volume of fluid or by measuring the volume of the fluid using one or more of the sensors 28. The system 10, and the controller 24, in particular, may also be configured to determine a volume of fluid that is received in, for example, a receptacle after passing over the area or surface of interest. In one embodiment, this may comprise measuring the volume of received fluid using one or more of the sensors 28 (e.g., in a catch basin at the bottom of a downspout). The system 10 (e.g., the controller 24) may be further configured to determine the difference between the emitted and received volumes of fluid, and based on that difference, determine whether there is a leak in the area or surface of interest. For example, if the difference meets (or, in an embodiment, meets or exceeds) a predetermined threshold, then it can be determined that there is a leak in surface of interest. Otherwise, it can be determined that there is not leak in the surface of interest.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more elements or other items, are each to be construed as open-ended, meaning that the listing is not to be considered as excluding other, additional elements or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A fluid deposition system, comprising:
    one or more electronic processors; and
    one or more electronic memories each electrically connected to at least one of the one or more electronic processors and having instructions stored therein;
    wherein the one or more electronic processors are configured to access the one or more electronic memories and execute the instructions stored therein such that the one or more electronic processors are configured to:
        determine whether one or more predetermined criteria are met for initiating deposition of fluid by a dispenser onto an area of interest located at or proximate to a building, roadway, or other stationary structure or surface, wherein the dispenser is installed at the area of interest;
        when it is determined that the one or more predetermined criteria are met, determine one or more operating parameters of the fluid deposition system to use in the deposition of the fluid onto the area of interest, wherein the one or more operating parameters include an amount of fluid volume for which to deposit, wherein the amount of fluid volume to be deposited is determined using feedback information and based on a numerical value corresponding to an estimated amount of deicer needed to melt an amount of snow and/or ice determined to be on the area of interest, wherein the numerical value is calculated using an equation based on environmental conditions of the area of interest, wherein the feedback information is used to update or otherwise determine the amount of fluid volume to be deposited for a supplemental iteration and the feedback information is determined during an interim period based on a performance measure from a previous point in time and a performance measure at a present time within the interim period, wherein the amount of fluid volume to be deposited during the supplemental iteration of fluid deposition for the area of interest is calculated dynamically using the performance measure from the previous point in time, and wherein the performance measure from the previous point in time and the performance measure at the present time are both determined based on data captured by one or more sensors installed at the area of interest; and
        following the determination of the one or more operating parameters, generate one or more electrical signals to initiate the fluid to be deposited onto the area of interest in accordance with the determined one or more operating parameters such that the fluid to be deposited according to the determined amount of fluid volume is deposited from the dispenser onto the area of interest.

2. The fluid deposition system of claim 1, wherein the system comprises a deicer system configured to deposit deicer fluid onto the area of interest.

3. The fluid deposition system of claim 1, wherein the one or more electronic processors is configured to obtain information relating to one or more predicted environmental conditions, and to determine whether at least one of the one or more predetermined criteria are met based on the obtained information.

4. The fluid deposition system of claim 1, wherein the one or more electronic processors is configured to determine whether a predetermined amount of time has elapsed since fluid was last deposited onto the area of interest, and to determine whether the one or more predetermined criteria are met based on that determination.

5. The fluid deposition system of claim 1, wherein the one or more electronic processors is configured to obtain information relating to the area of interest, and to determine whether at least one of the one or more predetermined criteria are met based on the obtained information.

6. The fluid deposition system of claim 1, wherein the one or more electronic processors is configured to determine at least one of the one or more operating parameters by obtaining information relating to one or more other operating parameters of the system, and to determine the at least one of the one or more operating parameters based on the obtained information.

7. The fluid deposition system of claim 1, wherein the determination of whether the one or more predetermined criteria are met includes obtaining weather data from a remote data source and processing the weather data to determine whether to initiate deposition of the fluid onto the area of interest.

8. The fluid deposition system of claim 7, wherein the weather data includes forecasted weather data that is obtained from the remote data source and used by the fluid deposition system to determine whether to the one or more predetermined criteria are met.

9. The fluid deposition system of claim 1, wherein the one or more electrical signals generated by the one or more electronic processors comprise one or more activation signals that activate one or more components of the system to cause the fluid to be deposited onto the area of interest in accordance with the determined one or more operating parameters.

10. A method of operating a fluid deposition system, comprising:
   determining, by one or more electronic processors, whether one or more predetermined criteria are met for initiating deposition of fluid by a dispenser onto an area of interest located at or proximate to a building, roadway, or other stationary structure or surface, wherein the dispenser is installed at the area of interest;
   when it is determined that the one or more predetermined criteria are met, determining, by the one or more electronic processors, one or more operating parameters of the fluid deposition system to use in the deposition of the fluid onto the area of interest, wherein the one or more operating parameters include an amount of fluid volume for which to deposit, wherein the amount of fluid volume to be deposited is determined using feedback information and based on a numerical value corresponding to an estimated amount of deicer needed to melt an amount of snow and/or ice determined to be on the area of interest, wherein the numerical value is calculated using an equation based on environmental conditions of the area of interest, wherein the feedback information is used to update or otherwise determine the amount of volume to be deposited for a supplemental iteration and feedback information is determined during an interim period based on a performance measure from a previous point in time and a performance measure at a present time within the interim period, wherein the amount of fluid volume to be deposited during the supplemental iteration of fluid deposition for the area of interest is calculated dynamically using the performance measure from the previous point in time, and wherein the performance measure from the previous point in time and the performance measure at the present time are both determined based on data captured by one or more sensors installed at the area of interest; and
   following the determination of the one or more operating parameters, generating, by the one or more electronic processors, one or more electrical signals to initiate the fluid to be deposited onto the area of interest in accordance with the determined one or more operating parameters such that the fluid to be deposited according to the determined amount of fluid volume is deposited from the dispenser onto the area of interest.

11. The method of claim 10, wherein the system comprises a deicer system configured to deposit deicer fluid onto the area of interest.

12. The method of claim 10, wherein the environmental conditions of the area of interest include one or more predicted environmental conditions, and wherein determining whether the one or more predetermined criteria are met comprises obtaining information indicating the one or more predicted environmental conditions and determining whether at least one of the one or more predetermined criteria are met based on the obtained information.

13. The method of claim 10, wherein determining whether the one or more predetermined criteria are met comprises determining whether a predetermined period of time has elapsed since fluid was last deposited onto the area of interest, and determining whether at least one of the one or more predetermined criteria are met based on that determination.

14. The method of claim 10, wherein determining whether the one or more predetermined criteria are met comprises obtaining information relating to the area of interest, and determining whether at least one of the one or more predetermined criteria are met based on the obtained information.

15. The method of claim 10, wherein determining one or more operating parameters comprises obtaining information relating to one or more other operating parameters of the system, and determining at least one of the one or more operating parameters based on the obtained information.

16. The method of claim 10, wherein the determination of whether the one or more predetermined criteria are met includes obtaining weather data from a remote data source and processing the weather data to determine whether to initiate deposition of the fluid onto the area of interest.

17. The method of claim 10, wherein generating one or more electrical signals comprises generating one or more activation signals that activate one or more components of the system to cause the fluid to be deposited onto the area of interest in accordance with the determined one or more operating parameters.

18. The method of claim 10, further comprising receiving one or more electrical signals representative of information relating to one or more conditions at the area of interest, and wherein the step of determining whether one or more predetermined criteria are met is based on the received information.

19. A non-transitory, computer-readable storage medium storing program instructions thereon that, when executed by one or more electronic processors of a fluid deposition system, causes the one or more electronic processors to carry out the method of:
   determining whether one or more predetermined criteria are met for initiating deposition of fluid by a dispenser onto an area of interest located at or proximate to a building, roadway, or other stationary structure or surface, wherein the dispenser is installed at the area of interest;
   when it is determined that the one or more predetermined criteria are met, determining one or more operating parameters of the fluid deposition system to use in the deposition of the fluid onto the area of interest, wherein the one or more operating parameters include an amount of fluid volume for which to deposit, wherein the amount of fluid volume to be deposited is determined using feedback information and based on a numerical value corresponding to an estimated amount of deicer needed to melt an amount of snow and/or ice determined to be on the area of interest, wherein the numerical value is calculated using an equation based on environmental conditions of the area of interest, wherein the feedback information is used to update or otherwise determine the amount of fluid volume to be deposited for a supplemental iteration and the feedback information is determined during an interim period based on a performance measure from a previous point in time and a performance measure at a present time within the interim period, wherein the amount of fluid volume to be deposited during the supplemental iteration of fluid deposition for the area of interest is calculated dynamically using the performance measure from the previous point in time, and wherein the performance measure from the previous point in time and the performance measure at the present time are both determined based on data captured by one or more sensors installed at the area of interest; and following the determination of the one or more operating parameters, generating one or more electrical signals to initiate the fluid to be deposited onto the area of interest in accordance with the determined one or more operating parameters such that the fluid to be deposited according to the determined amount of fluid volume is deposited from the dispenser onto the area of interest.

20. The non-transitory, computer-readable storage medium of claim 19, wherein the determination of whether the one or more predetermined criteria are met includes obtaining weather data from a remote data source and processing the weather data to determine whether to initiate deposition of the fluid onto the area of interest.

* * * * *